Jan. 31, 1961 C. W. SKELTON ET AL 2,970,226

ELECTRONIC TIMING DEVICE

Filed Nov. 20, 1956 10 Sheets-Sheet 1

INVENTORS
CHARLES W. SKELTON
JACK S. MASON

BY Stevens, Davis, Miller & Mosher

ATTORNEYS

INVENTORS
CHARLES W. SKELTON
JACK S. MASON
BY Stevens, Davis, Miller & Mosher
ATTORNEYS

INVENTORS
CHARLES W. SKELTON
JACK S. MASON

BY Stevens, Davis, Miller and Mosher
ATTORNEYS

Jan. 31, 1961 C. W. SKELTON ET AL 2,970,226

ELECTRONIC TIMING DEVICE

Filed Nov. 20, 1956

10 Sheets-Sheet 4

INVENTORS
CHARLES W. SKELTON
JACK S. MASON

BY Stevens, Davis, Miller & Mosher

ATTORNEYS

Jan. 31, 1961 C. W. SKELTON ET AL 2,970,226

ELECTRONIC TIMING DEVICE

Filed Nov. 20, 1956 10 Sheets-Sheet 5

INVENTORS
CHARLES W. SKELTON
JACK S. MASON

BY Stevens, Davis, Miller & Mosher
ATTORNEYS

INVENTORS
CHARLES W. SKELTON
JACK S. MASON

BY Stevens, Davis, Miller and Mosher
ATTORNEYS

Jan. 31, 1961 C. W. SKELTON ET AL 2,970,226

ELECTRONIC TIMING DEVICE

Filed Nov. 20, 1956 10 Sheets-Sheet 7

INVENTORS
CHARLES W. SKELTON
JACK S. MASON

BY Stevens, Davis, Miller & Mosher
ATTORNEYS

Jan. 31, 1961 C. W. SKELTON ET AL 2,970,226

ELECTRONIC TIMING DEVICE

Filed Nov. 20, 1956 10 Sheets-Sheet 8

INVENTORS
CHARLES W. SKELTON
JACK S. MASON

BY Stevens, Davis, Miller and Mosher
ATTORNEYS

INVENTORS
CHARLES W. SKELTON
JACK S. MASON

BY Stevens, Davis, Miller & Mosher
ATTORNEYS

INVENTORS
CHARLES W. SKELTON
JACK S. MASON

BY Stevens, Davis, Miller & Mosher
ATTORNEYS 2,970,226

ELECTRONIC TIMING DEVICE

Charles W. Skelton, Irving, and Jack S. Mason, Richardson, Tex., assignors to Texas Instruments Incorporated, Dallas, Tex., a corporation of Delaware Filed Nov. 20, 1956, Ser. No. 623,385

14 Claims. (Cl. 307—88.5)

This invention relates to electronic timing devices which can be selectively adjusted for any time interval.

A primary object of the invention is to provide such a timer which is light weight and compact, and which will accurately actuate an output device after a selected interval of time which can be varied over a wide range.

A further object of this invention is to provide such a timing device in which transistor components are used.

A further object of this invention is to provide a timing device which utilizes an oscillator for providing a time base and has means for maintaining the oscillator at a constant temperature.

A further object of this invention is to provide a new and improved method of actuating an output device after a selected interval of time.

A further object of one of the embodiments of this invention is to provide a unit which will actuate an output device at a selectively variable rate, which can be adjusted over a wide range.

A further object of one embodiment of this invention is to provide a timing device that will periodically actuate an output device to control an output circuit for an accurately predetermined length of time, with the period of time between actuations selectively variable.

A further object of another embodiment of this invention is to provide a device which can be set to actuate an output device after a variable length of time which can be easily selected by using a control which is marked in standard units of time.

In general, according to the invention, a regularly occurring output waveform is obtained from a crystal oscillator and the frequency of the waveform is then divided by means of a binary counting chain. The resulting waveform is fed into a second binary counting chain which can be preset to initially register any desired count so that the output from the last stage of the chain will come after an interval which varies according to the presetting of the binary counting chain. No tubes are used in the timing devices. Transistors are used to perform all amplification, pulse shaping, and pulse inversion purposes. The flip-flops in the counting chains are transistor flip-flops. By using transistors, the necessary size and weight of the timer is greatly diminished. A heater is provided for the crystal and the oscillator and the heater and the crystal are placed together in an insulated oven which maintains the crystal at a constant temperature and thereby the oscillator produces a constant frequency output.

According to one form of the invention, which henceforth shall be referred to as an intervalometer, an output is immediately obtained and succeeding pulses occur at regularly spaced intervals. The time duration of these intervals can be selectively varied. The intervalometer is useful to operate a sequence picture camera which is mounted on an aircraft to take continuous pictures of the terrain. The output pulses are used to trigger the sequence picture camera so that a picture is taken at regular predetermined intervals depending upon the setting of the intervalometer. By setting the intervalometer to the correct interval, which depends upon aircraft altitude, speed, etc., the individual pictures will overlap slightly and a continuous picture can be obtained by joining the picture together into one long strip.

According to a second form of the invention, which shall be henceforth called a miniature timer, an output condition is produced after a long period of time, which period can be selectively varied by the operator. This form of the invention could be used to trigger a bomb, for example. The miniature timer is set at the correct count by means of a control board with a plurality of contacts mounted on the board which can be contacted with a probe, and the miniature timer is so arranged so that the setting can be made in days, hours, minutes and seconds.

A full and complete understanding of the invention and its purpose will be apparent from the detailed disclosure of the invention to follow in which reference is made to the drawings, wherein:

Figure 1 shows a block diagram of the intervalometer.

Figures 2*a*, 2*b*, and 2*c* show the detailed circuitry of the intervalometer.

Figures 5*a*, 5*b*, 5*c*, and 5*d* show the detailed circuitry of the miniature timer.

Figure 6:
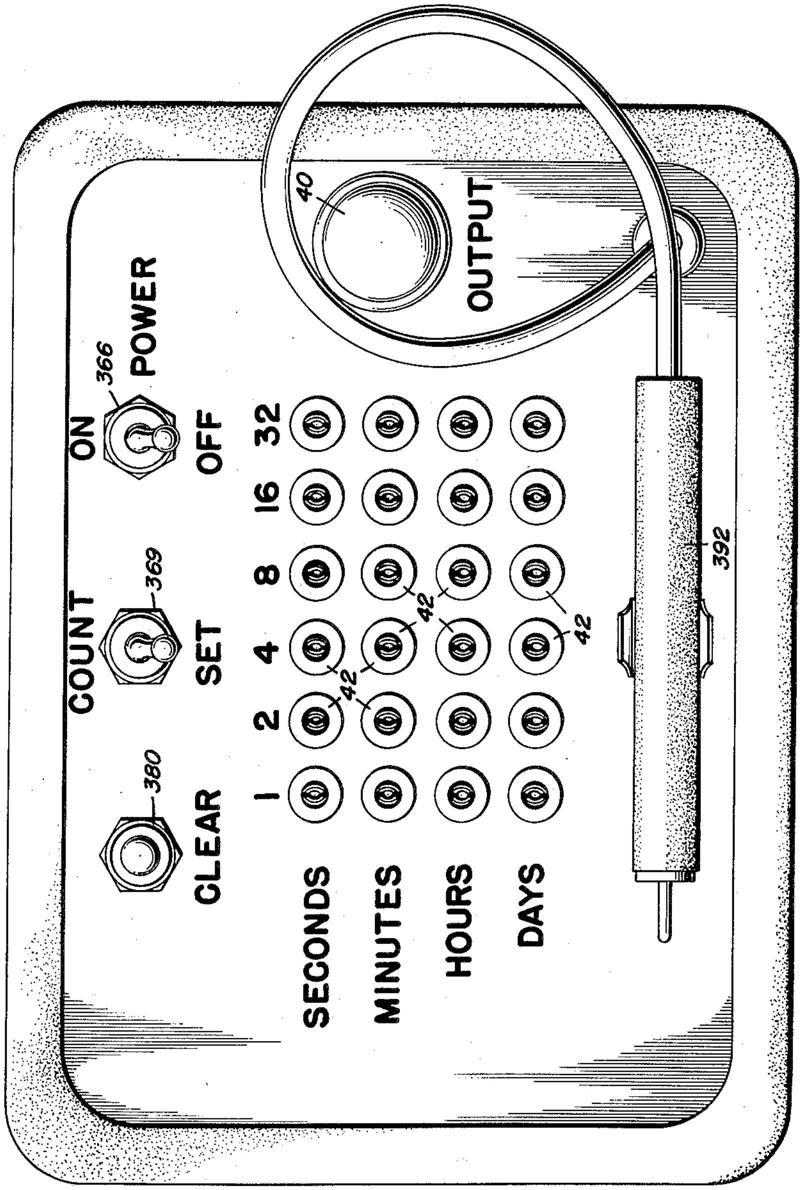

Figure 6 shows the control board for setting the miniature timer.

Figure 1:
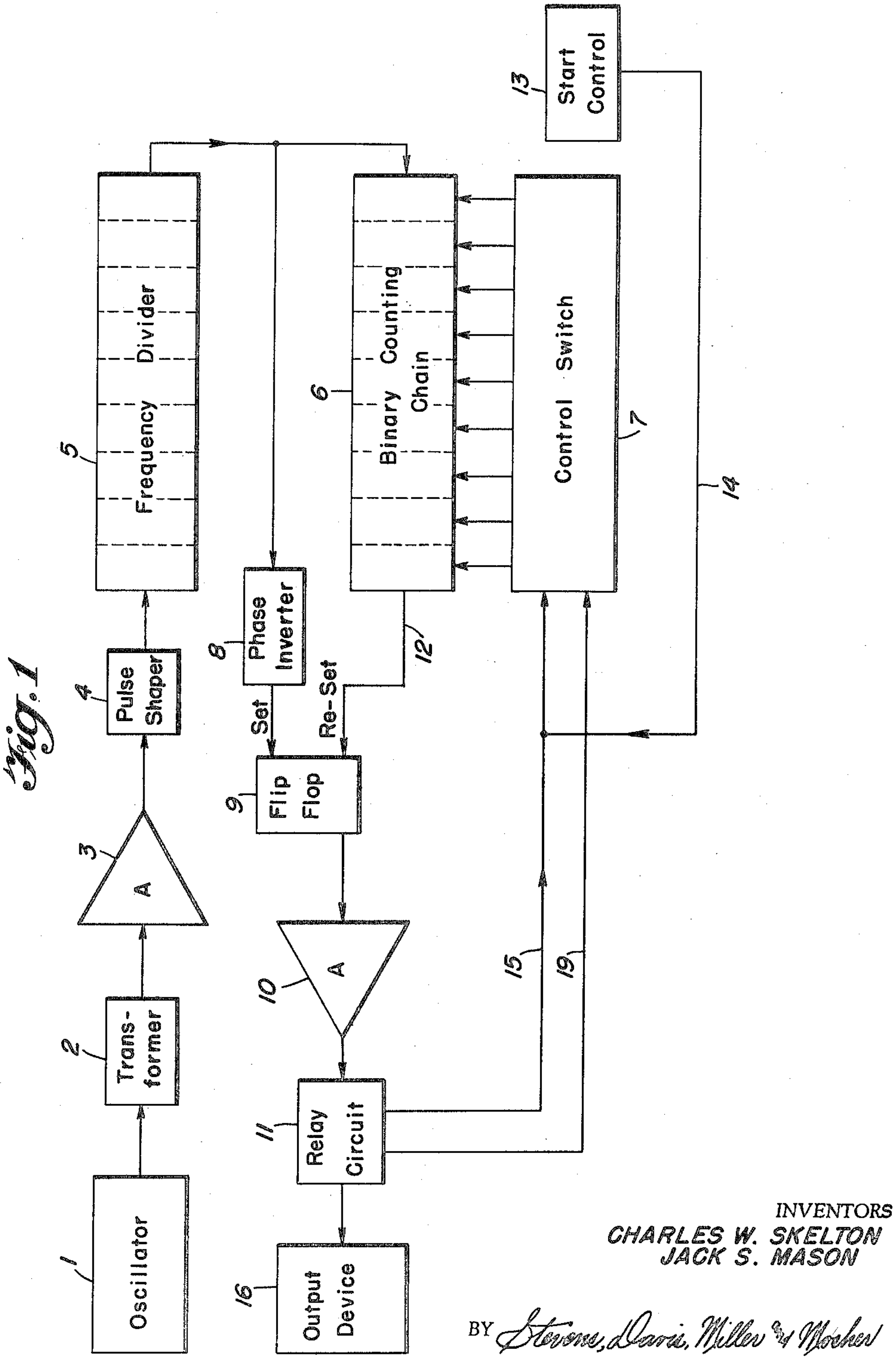

Referring now to Figure 1, a block diagram of the intervalometer is shown. The output of oscillator 1 is a constant frequency of 2,048 cycles per second and is applied to a transformer 2, and then amplified by amplifier 3. The output from the amplifier 3 is fed into pulse shaper 4 which produces a square wave output at the same frequency as that of the oscillator 1. This output from the pulse shaper is fed into the frequency divider 5. The function of the frequency divider is to produce one output cycle for every five hundred twelve input cycles. The output from the frequency divider is fed into the binary counting chain 6, and to the phase inverter 8. The output from the frequency divider is a square wave at 4 cycles per second. The waveform is a high voltage for ⅛ of a second followed by a low voltage for ⅛ of a second. When this waveform is applied to the binary counting chain 6, and the phase inverter 8, it is differentiated. This operation changes the waveform into positive and negative spikes or pulses, the positive spike occurring when the square wave changes from a low voltage to a high voltage and the negative spike occurring when the square wave changes from a high voltage to a low voltage. The resulting waveform applied to the phase inverter 8 and the binary counting chain 6 is a series of alternately occurring positive and negative spikes with a time interval of ⅛ second between each occurring spike and a time interval of ¼ second between each negative spike. The outputs from the binary counting chain 6 and the phase inverter 8 are both applied to the flip-flop 9, the latter to set the flip-flop and the former to reset it. The binary counting chain 6 and the flip-flop 9 are both adapted to be only responsive to negative spikes. The binary counting chain 6 counts only the negative spikes and when it reaches maximum count, an output condition is produced on line 12 to reset the flip-flop 9. The output condition produced on line 12 is a change from a high voltage to a low voltage, which, on being applied to the flip-flop 9, is differentiated into a negative spike, which causes the flip-flop 9 to reset. The time of this change in voltage being produced on line 12 coincides with the negative spike applied to the first stage of the binary counting chain 6 which caused this change in voltage. Consequently, the time of the resetting of the flip-flop 9 coincides with the time of a negative pulse being differentiated from the square wave produced by the frequency divider 5. The output from the frequency divider, upon being fed into the phase inverter 8, is differentiated into positive and negative spikes. The phase inverter 8 inverts the resulting wave form so that the positive spike becomes a negative spike and the negative spike becomes a positive spike. The negative spike produced by the phase inverter coincides with the time that a positive spike is differentiated from the square wave produced by the frequency divider 5 which is ⅛ of a second after the time of the negative spike. The output from the phase inverter is applied to the flip-flop 9, which is thereby set as is stated above. The flip-flop 9 is only responsive to negative spikes, so the setting of the flip-flop 9 occurs at a time coinciding with a positive spike differentiated from the square wave output from the frequency divider 5. Since the output from the frequency divider is continuously applied to the flip-flop 9 through the phase inverter, the setting of the flip-flop 9 will occur at the time of the first positive pulse differentrated from the square wave output of the frequency divider occurring after the resetting of the flip-flop 9 by the output of the binary counting chain 6. Since the positive pulse comes ⅛ of a second after the negative pulse, the flip-flop 9 is again set ⅛ of a second after it is reset.

When the negative spike differentiated from the output of the binary counting chain 6 resets the flip-flop 9, it causes a voltage to be applied to amplifier 10 which amplifies voltage and applies it to the output relay circuit 11, causing actuation of this circuit. Since the flip-flop is set again ⅛ of a second later by the negative spike from the phase inverter 8, an output voltage is supplied to amplifier 10 and to the output relay circuit for only ⅛ of a second.

When the output relay circuit receives a voltage from the amplifier 10, it applies a pulse of 28 volts to the control switch 7 on line 15 and a ground on line 19. The function of the control switch 7 is to set the binary counting chain to register a predetermined count. The control switch 7 can select any desired count to be registered. The time interval between the times that the flip-flop 9 is reset by the output from the last stage of the counting chain will be determined by the selection of the control switch 7.

Before the timing operation begins, the start control maintains a bias of 28 volts applied to the control switch 7 over lines 15 and 14. The control switch 7 applies the 28 volts to each stage of the binary counting chain to originally set it to register its highest count. That is, the counting chain is originally set at the start of the operation so that the first negative spike counted will cause the last stage of the counter to produce an output which when differentiated, will be a negative spike. To start operation of the intervalometer, the start control 13 removes the bias from line 14 removing the 28 volts applied to each stage of the binary counter. When the first negative spike is differentiated from the square wave produced by the frequency divider and is counted by the binary counter, the last stage will change the output applied to line 12 from a high voltage to a low voltage which immediately causes flip-flop 9 to reset and apply a voltage to the relay circuit 11. The relay circuit 11 then actuates the output device 16 and also produces a 28 volt pulse on line 15 and a ground simultaneously on line 19. The simultaneous application of the 28 volt pulse and the grounding of line 19 actuates the control switch to set the binary counting chain 6 to register a selected count in accordance with the setting of the control switch. Binary counting chain 6 then counts the cycles received from the frequency divider and the duration of the time interval before the next output condition on line 12 to reset flip-flop 9 depends upon the selection made by the control switch 7. When this output condition again occurs on line 12, it again causes the actuation of the output circuit which again produces a pulse on line 15 and applied a ground to line 19 to actuate the control switch 7 again to set the binary counting chain 6 at a predetermined count and the binary counting chain again counts the cycles from the frequency divider. Again, an actuating output condition is produced on line 12 at exactly the same interval later, the interval being determined by the setting of the control switch 7. This operation continuously repeats itself. As a result, the relay circuit 11 is repetitively actuated at a rate determined by the setting of the control switch 7. Each time the output relay circuit is actuated, it in turn actuates the output device 16 so that the output device 16 is actuated at a repetitive rate determined by the control switch 7.

Figure 2A:
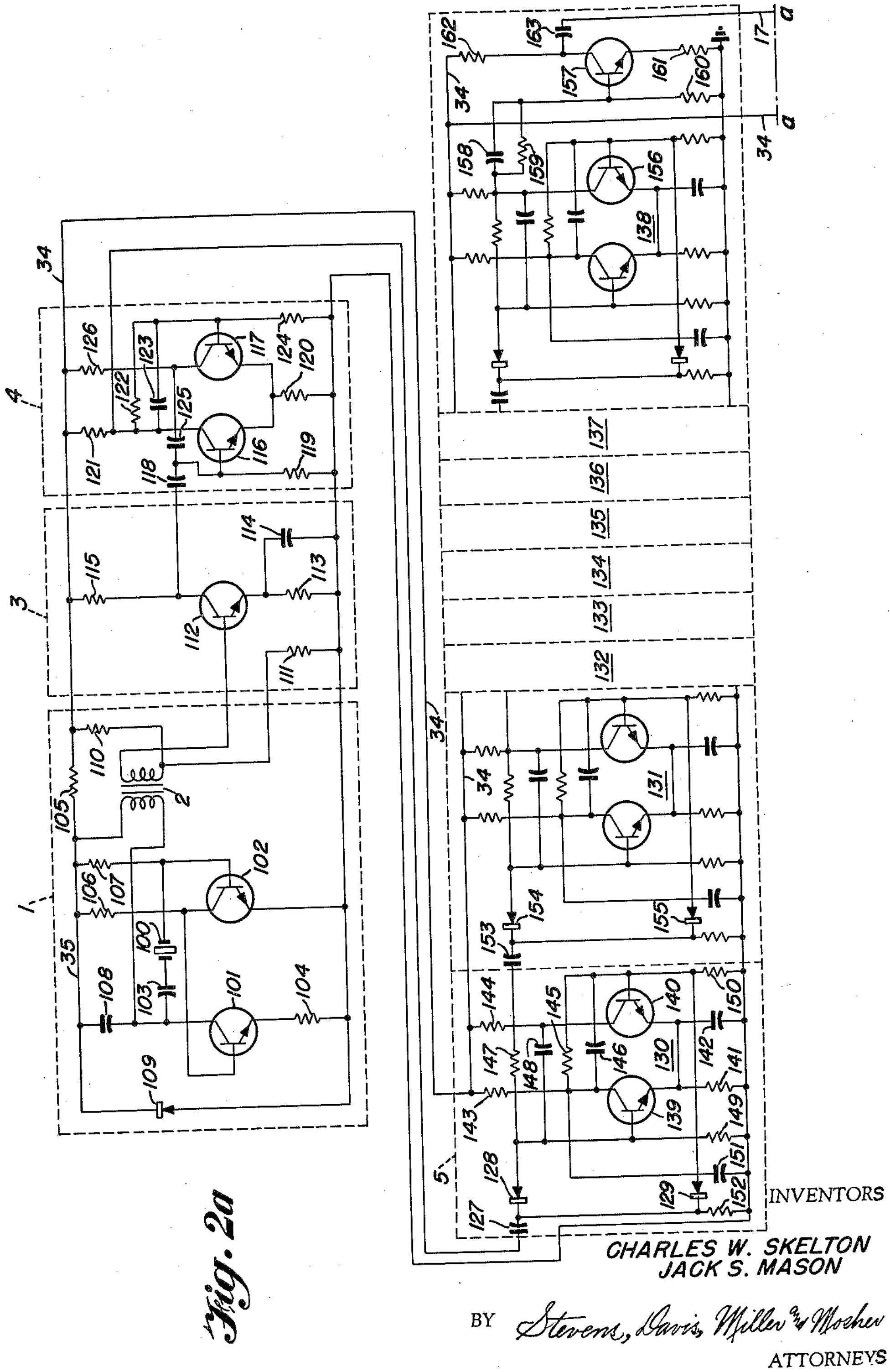
Figure 2B:
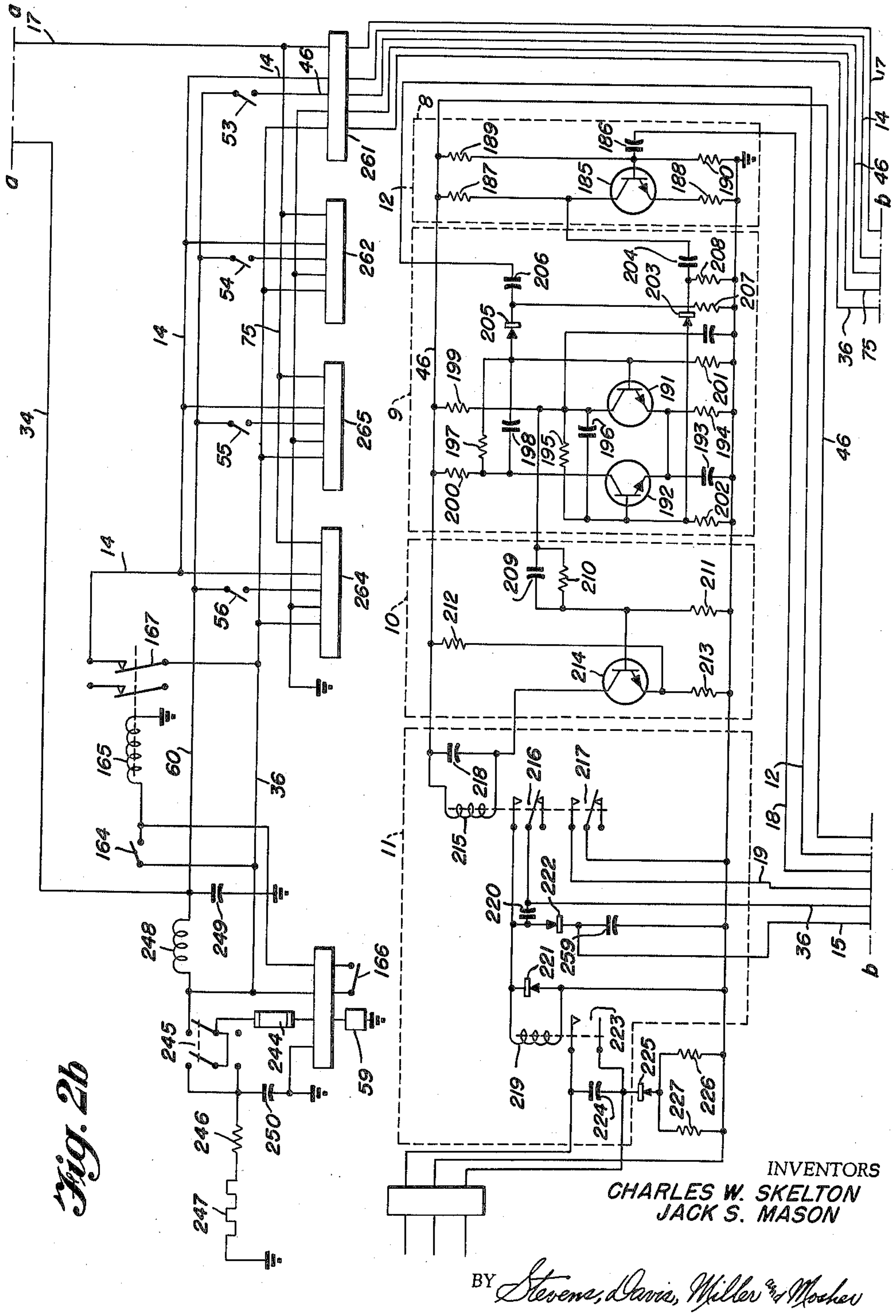
Figure 2C:
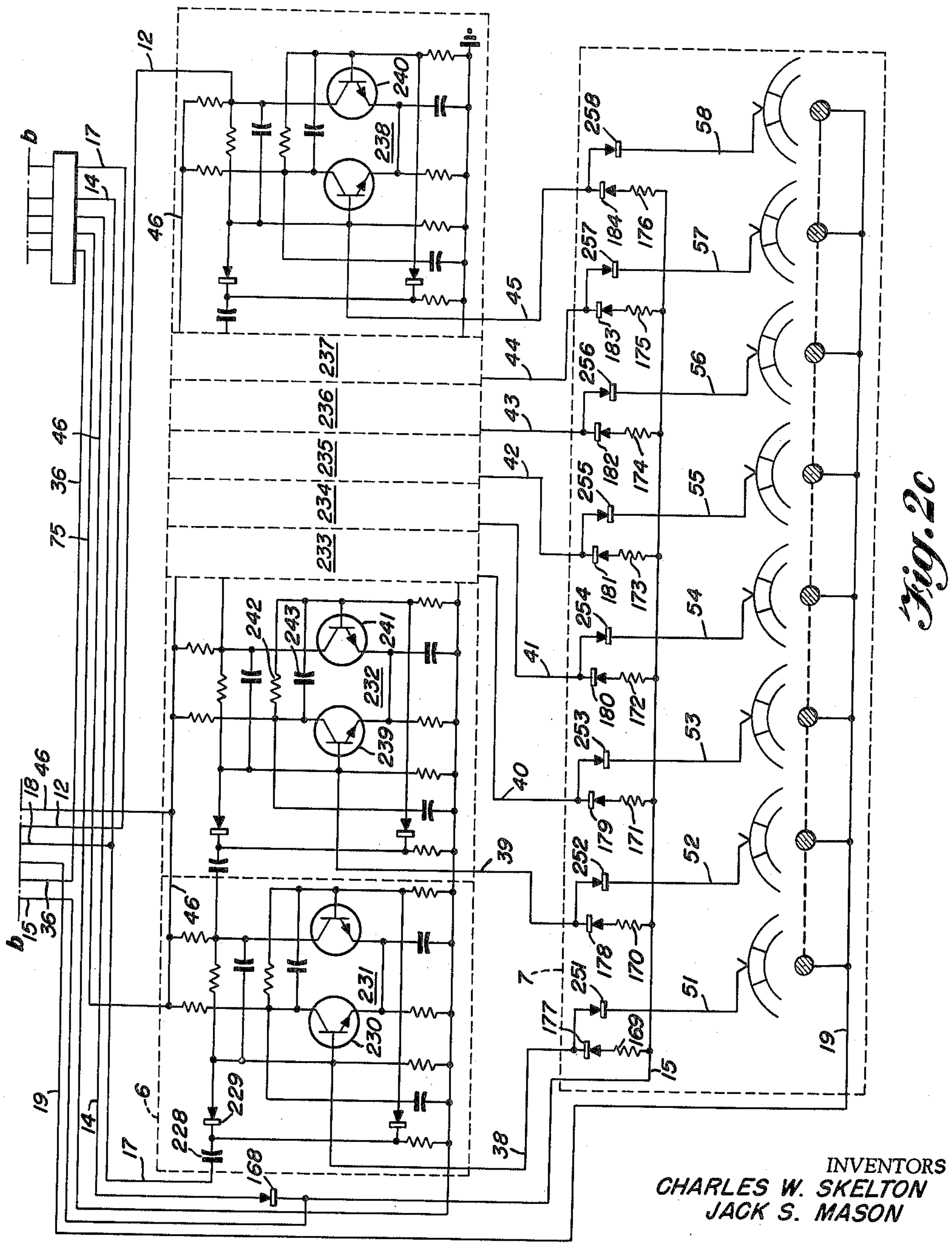

Referring now to Figures 2*a*, 2*b*, and 2*c*, the detailed circuitry of the intervalometer is shown. Oscillator 1 is composed of a crystal 100 and transistors 101 and 102. The crystal 100 is connected in series with a capacitor 103. One terminal of the crystal is connected to the base of transistor 102. The emitter of the transistor 102 is grounded and the collector is connected to the base of transistor 101. The emitter of transistor 101 is connected through resistor 104 to ground. The collector of the transistor 101 is connected to the series circuit of the capacitor 103 and crystal 100. A filtered D.C. voltage of 28 volts is applied to the oscillator circuit on line 34. This voltage is applied through resistor 105 to line 35 and is used as the power supply for the oscillator and to bias the transistors 101 and 102. Resistor 106 is connected from the collector of transistor 102 to line 35 and resistor 107 is connected from the base of transistor 102 to the line 35. An output is taken from the oscillator by connecting the primary of the transformer 2 from the collector of the transistor 101 to the conductor 35. A capacitor 108 is connected across the primary winding of the transformer 2. A rectifier 109 is connected from lead 35 to ground. This rectifier serves to regulate the voltage on line 35. The frequency at which the oscillator performs depends upon the resonant frequency of the crystal 100 and the capacitor 103, whose capacity is selected to be such a value so that the oscillator performs at 2,048 cycles per second.

A resistor 110 is connected from the line 34 to one output terminal of the transformer 2. A second resistor 111 is connected from this same output terminal to ground. The output from the transformer is taken from the other terminal of the secondary winding and is applied to the amplifier 3 at the base of transistor 112. The emitter of transistor 112 is connected to ground through the parallel circuit of resistor 113 and capacitor 114. The collector of transistor 112 is connected to line 34 through the resistor 115.

The amplified output is taken from the collector of transistor 112 and applied to the pulse shaper 4. The pulse shaper 4 is a multivibrator which produces a square wave output at the same frequency as the oscillator 1 when driven by the amplified oscillator voltage. This multivibrator is composed of transistors 116 and 117 and operates like an ordinary transistor multivibrator. The voltage from the amplifier 3 is applied to the base of transistor 116 through capacitor 118. The base is connected to ground through the resistor 119. The emitters of transistors 116 and 117 are connected together and to ground through resistor 120. The colletcor of transistor 116 is connected to the power source on line 34 through resistor 121. The collector of transistor 116 is also connected to the base of transistor 117 by means of the parallel circuit of resistor 122 and capacitor 123. The base of transistor 117 is connected to ground by means of resistor 124. The collector of transistor 117 is connected to the base of transistor 116 by means of the capacitor 125 and to the power source in line 34 through resistor 126.

When the voltage from the amplifier 3 drives the base of the transistor 116 negative it causes this transistor to by the 28 volts applied to the collector of transistor 116 rises rapidly to an equilibrium value, which is determined by the 28 volts applied to the colletcor of transistor 116 through resistor 121. This causes a positive voltage spike to be transmitted through capacitor 123 to the base of transistor 117 causing this transistor to start conducting. When transistor 117 begins conducting, it transmits a negative pulse or spike to the base of transistor 116 through the capacitor 125, thus causing the transistor 116 to be driven more quickly to cut off. When the voltage applied to the base of transistor 116 from the amplifier 3 begins to become positive, the transistor 116 begins to conduct. When transistor 116 begins to conduct, a negative voltage spike is applied to the base of transistor 117 through capacitor 123 causing transistor 117 to stop conducting. When transistor 117 stops conducting, a positive voltage spike is applied to the base of transistor 116, which is thereby driven more quickly to a full "on" condition. This operation results in a square wave being produced at the collector of transistor 116 at the same frequency as the voltage applied from the amplifier 3 which is the frequency of the oscillator 1. The square wave voltage produced at the collector of transistor 116 is the output voltage of the pulse shaper and this voltage is applied to the frequency divider 5.

The output from the pulse shaper on being applied to the frequency divider 5 is differentiated by the capacitor 127 so that the voltage applied to recitifiers 128 and 129 of the first stage 130 of the frequency divider 5 is a differentiated square wave output which is a positive spike followed by a negative spike. The rectifiers 128 and 129 only allow the negative spike to pass to the bases of transistors 139 and 140 of the first stage of the frequency divider 5.

The frequency divider 5 comprises nine flip-flop stages 130–138 and the first eight are stages exactly alike but only the first stage will be described in detail, and only the first, second and last stages are shown in detail. Since the third through eighth stages 132–137 are identical with the first and second stages, they are shown only as dashed line rectangles. The first stage comprises two transistors 139 and 140 connected together in a flip-flop circuit. The emitters of transistors 139 and 140 are connected together and to ground through a parallel circuit of resistor 141 and capacitor 142. The collectors of transistors 139 and 140 are connected to the power line 34 through the resistors 143 and 144, respectively. The collector of transistor 139 is also connected to the base of transistor 140 by means of the parallel circuit of resistor 145 and capacitor 146. The collector of transistor 140 is connected to the base of transistor 139 by means of the parallel circuit of resistor 147 and capacitor 148. The bases of transistors 139 and 140 are connected to ground through resistors 149 and 150, respectively. The collector of transistor 139 is also connected to ground through capacitor 151. A resistor 152 is connected from between the rectifiers 128 and 129 and the differentiating capacitor 127 to ground.

The negative spike passed by rectifier 128 is applied to the base of transistor 139 causing this transistor to cut off and causing the voltage on its collector to rise, thus causing a pulse to be applied to the base of transistor 140 through the capacitor 146. This is a positive pulse and causes the transistor 140 to start conducting and the conduction of this element maintains the bias on transistor 139 through resistor 147, thus maintaining the transistor 139 in a cut off conditon after the circuit reaches a stable state. The next negative pulse is passed by rectifier 129 and is applied to the base of transistor 140. This causes transistor 140 to stop conducting and causes the potential of the collector of transistor 140 to rise. As a result of the collector having a rising potential, a positive pulse is applied through capacitor 148 to the base of transistor 139. This causes transistor 139 to start conducting. When transistor 139 stops conducting, it places a bias through resistor 145 on the base of transistor 140 maintaining transistor 140 in a nonconducting state. The result is that after the pulse has been passed by rectifier 129, the transistor 139 starts conducting and the transistor 140 stops conducting. The next pulse applied will again turn the transistor 139 off and the transistor 140 on, so that each succeeding negative pulse passed by rectifiers 128 and 129 alternately cause transistors 139 and 140 to conduct. As a result, a square wave is produced at the collector of transistor 140 at one-half the frequency of the negative spikes passed by rectifiers 128 and 129. This square wave is differentiated by capacitor 153 in the next stage 131 of the frequency divider 5 producing a negative spike followed by a positive spike which is applied to rectifiers 154 and 155 in the next stage. The next stage operates only on the negative spikes because rectifiers 154 and 155 only allow the negative spikes to pass. The next stage has the same circuit and operates exactly like the preceding stage but since a negative spike is only produced by capacitor 153 at half the frequency that a negative spike is produced by capacitor 127, the second stage only operates at half the frequency of the preceding stage. Each suceeding stage is connected to the preceding stage in exactly the same manner so that each succeeding stage operates at half the frequency of the preceding stage. As a result, in the last flip-flop stage 138 of the frequency divider, a waveform is produced at the collector of transistor 156 at a frequency of four cycles per second. This wave is applied to an amplifier circuit consisting of the transistor 157. The voltage is applied through capacitor 158 to the base of this transistor. The capacitor 158 shunts the resistor 159, which provides the proper bias to the base of transistor 157. The base of the transistor is connected to ground through the resistor 160, and the emitter is connected to ground through the resistor 161. The collector of transistor 157 is connected to the power line 34 through resistor 162. The output from the amplifier cricuit is taken from the collector of transistor 157 through capacitor 163, which isolates the D.C. power from the output. The voltage output from the collector of transistor 157 is a square wave and is applied to the binary counting chain 6.

The switches 164 and 166 control the start of the timing operation of the intervalometer. Initially, 28 volts are maintained on line 14 by means of the contacts 167 of the relay 165. When the 28 volts are removed from line 14, the operation of the intervalometer is begun. By closing switch 164, the relay 165 will be energized over an obvious circuit from an unfiltered power supply of 28 volts on line 36. The pilot pickle switch 166 is provided in parallel with switch 164 for the remote control of relay 165. When relay 165 is energized, it opens contacts 167. When either switch 164 or the pilot pickle switch 166 is closed, the 28 volts are removed from line 14 by the opening of contacts 167.

The 28 volts initially applied to line 14 are applied to the control switch 7 over rectifier 168 and line 15. The 28 volts that are initially applied to line 15 in this manner are applied through the control switch 7, to the binary counting chain 6 on lines 38 through 45. This is applied from line 15 through the resistors 169—176 and through rectifiers 177–184, respectively. When the 28 volts are removed, the intervalometer begins operation.

The output from the frequency divider 5 is also applied to the phase inverter 8 over lines 17 and 18. The waveform from the frequency divider 5 is applied to the base of transistor 185 through the capacitor 186 which differentiates the waveform changing it to a positive spike followed by a negative spike. The transistor 185 changes the negative spike into a positive spike and the positive spike into a negative spike. The resulting waveform appears at the collector of transistor 185. The base of transistor 185 is connected to filtered source of 28 volts D.C. on line 46 through resistor 189 and to ground through resistor 190. The emitter of transistor 185 is connected to ground through resistor 188 and the collector is connected to line 46 through resistor 187. The output of the phase inverter taken from the collector of transistor 185 is applied to the flip-flop 9.

Flip-flop 9 is composed of two transistors, 191 and 192 and operates like the previously described flip-flops in the frequency divider. The emitters of transistors 191 and 192 are connected to ground through the parallel circuit of capacitor 193 and resistor 194. The collector of transistor 191 is connected to the base of transistor 192 through the parallel circuit of resistor 195 and capacitor 196 and the collector of transistor 192 is connected to the base of transistor 191 through the parallel circuit of resistor 197 and capacitor 198. The collectors of these transistors are connected to the 28 volts of filtered D.C. on line 46 through resistors 199 and 200, respectively. The bases are connected to ground through resistors 201 and 202, respectively. The output from the phase inverter 8 is applied to the base of transistor 192 through rectifier 203 and capacitor 204. The input from the binary counting chain 6 is applied over line 12 to the base of transistor 191 through the rectifier 205 and capacitor 206. Both input circuits are connected to ground from between their respective rectifiers and capacitors through resistors 207 and 208, respectively. Only negative pulses from the phase inverter are passed by rectifier 203 to the base of transistor 192. These applied pulses cause the transistor 192 to turn off, or stop conducting, and the flip-flop 9 is left in a state whereby transistor 192 is nonconducting and transistor 191 is conducting. As a result, a low voltage output is produced from the collector of transistor 191. When the output voltage on the reset line 12 from the binary counting chain 6 changes from a high voltage to a low voltage, the capacitor 206 differentiates the waveform and produces a negative pulse. This negative pulse is passed by rectifier 205 to the base of transistor 191, thus causing transistor 191 to turn off and the transistor 192 to turn on. When transistor 191 turns off, the collector of transistor 191 rises and a high voltage output is produced from flip-flop 9 from the collector of this transistor. This high voltage will be maintained until the next negative pulse is received by the flip-flop from the phase inverter 8. This next negative pulse will come at a time one-eighth of a second later so that the high voltage is produced from the flip-flop for one-eighth of a second as is explained above. The high voltage output is applied to base of transistor 214 in amplifier 10 through the parallel circuit of capacitor 209 and resistor 210. The base of the transistor is connected to ground through resistor 211. The emitter is connected to the power source applied to line 46 through resistor 212. The resistor 213 connects the emitter to ground. The output from the amplifier is taken from the collector of transistor 214. This ouput is applied to the relay circuit 11. The relay circuit 11 includes a relay 215, the winding of which is connected from the collector of transistor 214 to the D.C. voltage on line 46. When a high voltage is applied to the base of transistor 214, it conducts and causes current to flow through the winding of relay 215 which as a result, closes its contacts 216 and 217. The current output from the amplifier 10 lasts for one-eighth of a second; however, the relay 215 will remain operated for a short period of time thereafter, because the capacitor 218, which is connected across the winding of the relay, causes a delayed releasing. Capacitor 218 is selected to maintain relay 215 operated for 150 milli-seconds. When the relay 215 operates, it applies a ground potential on line 19 over contacts 217. This grounds a portion of the circuit of the control switch 7. Relay 215 also closes contacts 216 and applies 28 volts to the winding of relav 219 from line 36.

A capacitor 220 is connected across contacts 216 and a rectifier 221 is connected across the winding of relay 219. When contacts 216 close, 28 volts is also applied over line 15 to the control switch 7 from line 36 through the rectifier 222. A capacitor 259 is connected from line 15 to ground. The relay 219 being energized closes contacts 223 which closes a circuit actuating the camera or other output device. The capacitor 224 is connected across contacts 223 and a circuit consisting of retifier 225 and resistors 226 and 227 connect the output circuit to ground to prevent the arcing of contacts 223. It can be seen that as a result of the operation of the output relay circuit, the relay 219 is operated to close a circuit to the output device, 28 volts is applied on line 15 to the control switch 7, and a ground is applied on line 19 to the control switch 7. These voltages are applied for the length of time that relay 215 remains operated which is 150 milli-seconds.

The binary counting chain 6 comprises 8 flip-flop stages 231–238, each of which are identical so only the first, second and last stages, 231, 232 and 238 are shown in detail. The stages 233–237 are shown as dashed line rectangles. The circuitry of each stage is the same as the circuitry of the first eight stages 130–137 of frequency divider 5 except that the input lines 38–45 are respectively connected to the bases of the left transistors of each stage. The binary counting chain 6 counts the input cycles on line 17 in the same manner that the frequency divider counts the input cycles from the pulse shaper 4. However, the count registered in the binary counter chain 6 can be set at a predetermined value so that the output from the last stage of the binary counting chain 6 which operates to reset the flip-flop 9 comes at regularly spaced time intervals, the length of which depend upon the setting of the binary counting chain 6. The control switch 7 presets the individual stages of the binary counting chain just as if a certain number of pulses had already been counted into the binary chain 6. At the start of the operation, initially the 28 volts was applied on lines 38 through 45 to the binary counter chain through the control switch 7. This caused each flip-flop stage of the binary counter chain 6 to be in the same state, this state being one in which the transistor of the left side is conducting and the transistor on the right side is not conducting. The square wave voltage from the frequency divider 5 on line 17 is applied to the capacitor 228 of the binary counting chain. The capacitor differentiates the square wave producing positive and negative pulses. The first negative pulse is passed by the rectifier 229 to the base of transistor 230 of the first stage 231 of the binary counting chain. This causes the first stage to switch over to the opposite state and causes a negative pulse at the same time to be applied to the base of transistor 239 of the second stage. The second stage switches over and as a result of this first pulse causes a negative pulse to be applied to the third stage 233 causing it to switch over. Similarly, as a result of the first pulse applied to the binary counting chain, all of the flip-flop stages switch over. Before the first negative pulse was applied to the base of trnasistor 230, each stage of the binary counting chain 6 was in a condition in which the left stage was conducting and the right stage was nonconducting. Therefore, the output on line 12 from the collector of the transistor 240 of the last stage 238 was a high voltage. As was explained above, the first negative pulse applied causes all the transistor stages to switch to the opposite state so that the output from the last stage 238 on line 12 changes from a high voltage to a low voltage. This output wave, which when differentiated by the capacitor 206 in the flip-flop 9, is a negative pulse, causes the flip-flop 9 to reset. As was stated above, when the flip-flop 9 resets, it causes operation of the relay 215 in the relay control circuit 11, and this operation causes a ground to be applied temporarily over line 19 and a positive 28 volts to be applied over line 15 to the control switch 7. The setting of the control switch causes, at this time, some of the lines 38 through 45 to be at ground potential and the other lines to be at plus 28 volts. When the first negative pulse was received by the binary counting chain 6, it caused all the stages of the binary counting chain to switch over to the opposite state, so that when the ground is applied to line 19 and the 28 volts to line 15, each stage of the binary counting chain is such that the transistor on the right side is conducting and the transistor on the left is in a non-conducting state. Only those stages on which a ground is connected to the lines 38 through 45 remain in the state of having the right side conducting and the left side non-conducting. Those stages which have the 28 volts applied to their respective setting lines 38 through 45 are switched to the opposite state, thus causing the left side to conduct and the right side to stop conducting. In this manner, a count is registered in the binary counter, and the cycles which are applied to the binary counting chain are counted in the binary counting chain in the manner described with respect to the frequency divider and an output pulse is produced after a time interval, depending on what count was registered in the binary counting chain by the lines 38—45.

The registering of the initial count in the binary counting chain is supervised by the control switch 7. The switch 7 controls the setting of the binary counting chain by either applying a ground or applying a positive 28 volts to each stage of the binary counting chain 6 over lines 38—45. Since the control switch 7 applies these voltages at a time immediately after the actuating output condition from the binary counter has been produced, all of the stages will be in the same state, that is, with the left side of the stage not conducting, so that each stage which has a ground applied to it will remain in that state and remain with the left side not conducting. Those stages to which a positive 28 volts is applied switch over to the opposite state. For example, suppose that the second stage 232 has voltage of 28 volts applied to it over line 39. This voltage will be applied to the base of transistor 239 and thus cause this transistor to conduct. When this transistor starts to conduct, it will cause the transistor 241 to stop conducting by causing a low voltage to be applied to the base of this transistor via the parallel circuit of capacitor 242 and resistor 243. In this manner, the second stage would be set into a condition in which the right transistor is non-conducting and the left transistor is conducting. In a like manner, each other stage which has 28 volts applied to it over its respective one of the setting lines 38—45 will also be set in the same condition. Each stage which has the ground voltage applied on its respective one of lines 38—45 will remain in the opposite state with left transistor not conducting and the right transistor conducting.

The control operation of the switch 7 occurs whenever an actuating output condition is produced by the binary counting chain. The operation of the control switch 7 is caused by a positive pulse being applied on line 15 and a ground being applied on line 19 at the same time. The details of the control switch are disclosed in patent application No. 584,126 now Patent No. 2,886,661 of Charles W. Skelton et al., filed on May 10, 1956. The switch operates to ground selected ones of the conductors 51—58 when a ground is applied to the control switch on line 19. Which ones, if any, of the lines 51—58 will be grounded depends upon the setting of the control switch. The grounding of selected ones of conductors 51 through 58 controls the potential applied to each stage of conductors 38—45. At the same time that a ground is applied to selected ones of the conductors 51—58, a voltage of 28 volts is applied over line 15 to the control switch. The conductors 51—58 are connected to conductor 38—45 through rectifiers 251—258 respectively and to conductor 15 through rectifiers 177—184 and resistors 169—176 respectively. The particular conductors 38—45, if any, which have a ground applied thereto over the selected ones of lines 51—58 will be at ground potential. The conductors 38—45 which do not have a ground applied over the selected ones of conductors 51—58 will be at a potential of 28 volts and cause the respective stage of the binary counting chain to change to the opposite state. For example, suppose a ground is applied on line 53, then current will flow from line 15, through resistor 171, through rectifiers 179 and 253 to the ground on line 53. There is no appreciable voltage drop across rectifier 253 and almost the entire 28 volts appears as a voltage drop across resistor 171. But if line 53 is not grounded to line 19, then there will be little current flow and approximately 28 volts will be applied to stage 233 over line 40.

Let us suppose for example that it is desired to operate the output device or camera once every 9.25 seconds. Since a negative pulse is differentiated from the square wave output of the frequency divider 5 once every ¼ of a second, the binary counting chain 6 must cause the actuation of the relay circuit 11 once for every 4×9.25=37 negative pulses so differentiated. Since the binary counting chain 6 is an 8 stage binary counter $2^8=256$ such negative pulses must be counted before the last stage of the counter changes from a high voltage to a low voltage if the counter is originally set to register a count of zero. In order for the binary counting chain 6 to produce an actuating output condition once every 37 pulses, the unit must be set to register a count of 256−37=219 by the control switch 7 each time the relay circuit 11 is actuated. In order to set the binary counting chain 6 to register this count, the left transistor must be conducting and the right transistor non-conducting in the 1st, 2nd, 4th, 5th, 7th and 8th stages, 231, 232, 234, 235, 237 and 238. In the 3rd and 6th stages, 233 and 236, the left transistor must be non-conducting and the right transistor conducting. At the time the setting occurs the binary counting chain has regisered a count of zero as is explained above so that the right transistor is conducting and the left transistor is non-conducting in each stage. Therefore 28 volts must be applied on lines 38, 39, 41, 42, 44 and 45 to switch the states of these stages when the relay circuit applies the 28 volts to line 15 and the ground 19. But ground must be applied on lines 40 and 43. In order to accomplish this the control switch is set to connect lines 53 and 56 to line 19 and lines 51, 52, 54, 55, 57 and 58 remain unconnected. The connecting of lines 53 and 56 to line 19 causes the ground potential on line 19 to be applied to lines 53 and 56. The remaining lines 51, 52, 54, 55, 57 and 58 are not connected and remain ungrounded. The grounding of lines 53 and 56 causes a ground potential to be applied to the 3rd and 6th stages over lines 40 and 43 in the manner described with respect to 2nd stage above. The remaining lines 38, 39, 41, 42, 44 and 45 are maintained at 28 volts by the voltage applied over line 15. As a result, the first, second, fourth, fifth, seventh and eighth stages of the binary counting chain 6 are switched to the opposite state wherein the left transistor is conducting and the right transistor is not conducting. The third and sixth stages remain in the state whereby the left transistor is not conducting and the right transistor is conducting. In this manner a count of 219 is registered in the binary counting chain 6 every time the relay circuit 11 is operated. It is obvious that the control switch 7 can selectively register any count from zero to 255 in the binary counting chain 6 simply by connecting different permutations and combinations of the lines 51—58 to the line 19. In this manner the interval of operation of the output device is controlled by the setting of the control switch.

Power is applied to the intervalometer from the D.C. power source 59. It is applied through the fuse 244 and the double-pole-double-throw power switch 245 to line 36, to the heater for the oven assembly through resistor 246 (to be explained below), and to the filter comprising inductor 248 and capacitor 249. A capacitor 250 is connected from between the switch 245 and the resistor 246 to ground. A filtered power supply is taken from the filter comprising inductor 248 and capacitor 249 and applied to line 34 and to line 60. Line 60 applies the filtered supply to line 46 over the selector switch 53.

The output from the frequency divider can be applied to a plurality of binary counters to simultaneously control the operation of several output devices connected to the terminal boards 261 to 264. One or more of the output devices can be put in operation by the selector switches 53, 54, 55 and 56. The numeral 75 indicates the ground connection between the power supply and the binary counting chain.

Figures 3, 4:
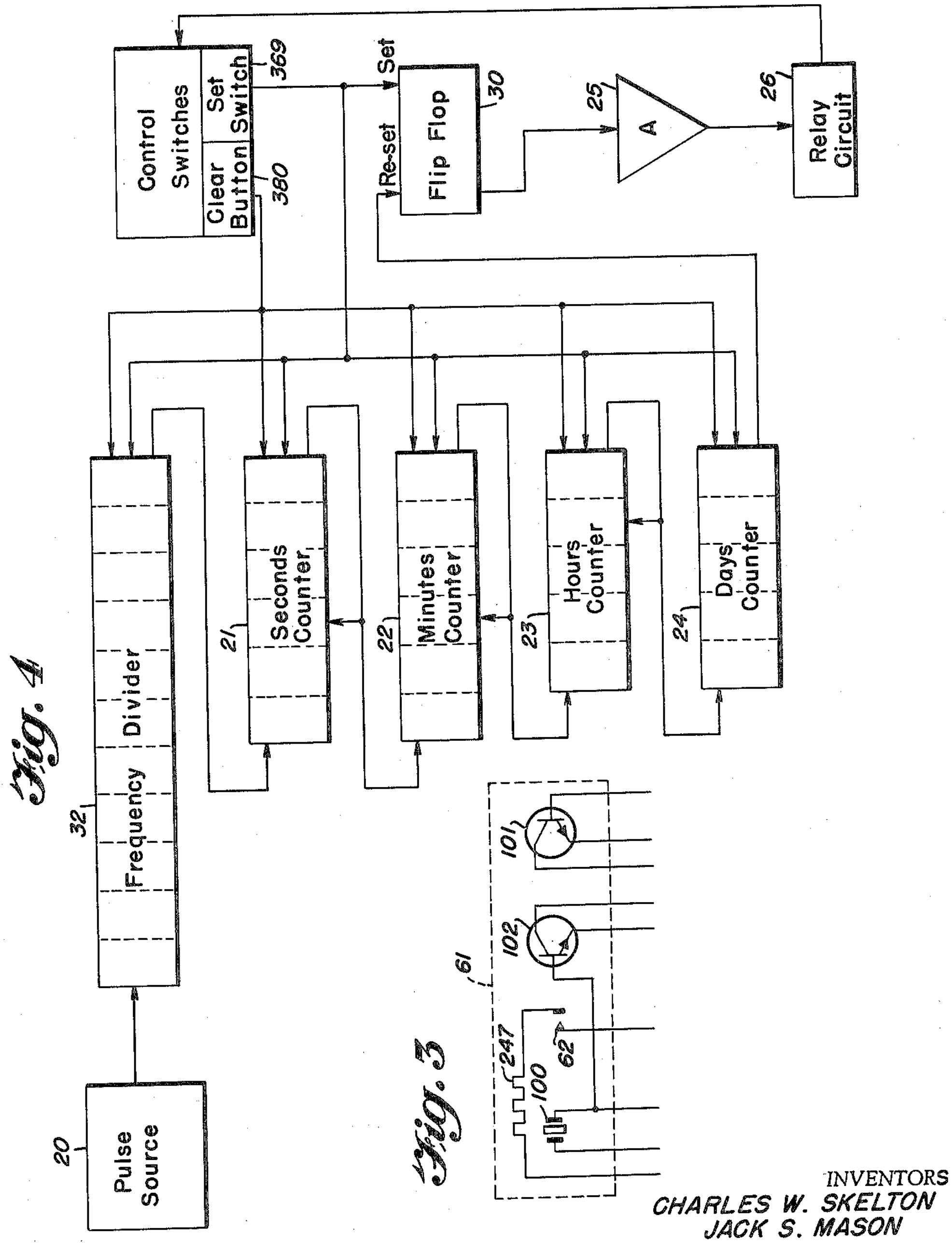
Figure 3 shows the oven assembly for the crystal oscillator for use in the intervalometer, but which also can be used in the miniature timer.
Figure 4 shows a block diagram of the miniature timer.

The oven assembly for the crystal oscillator is shown in Figure 3. The transistors 101 and 102 and the crystal 100 of the oscillator 1 are enclosed in the heat insulated casing 61 together with the temperature control means. The temperature control means comprises the resistance heater 247 and the bimetal contacts 62. The temperature control means maintains the oven at a constant temperature. When the oven gets below this predetermined temperature, the contacts 62 close the circuit to the heater 247. When the contacts get above this predetermined temperature the contacts 62 open the circuit to the heater 247. In this manner the oven remains at a relatively constant temperature, and the oscillator is able to produce a constant frequency output. This oven assembly is shown for use in combination with the intervalometer but it also could be used in the miniature timer.

In Figure 4 is shown a block diagram of the miniature timer. The pulse source 20 is the same as the oscillator and pulse shaper combination in the intervalometer fully described above. The output from the pulse shaper is a square wave output at 2048 cycles per second and is applied to the frequency divider 32. The frequency divider 32 is an eleven stage binary counter. It receives the output from the pulse source 20 and produces an output square wave at one cycle per second. The output from the frequency divider 32 is applied to the seconds counter 21 which counts the input cycles. Seconds counter 21 is so adapted as to produce an output cycle once every minute. The output cycles from the seconds counter is applied to, and counted by, the minutes counter 22. The output from the minutes counter is so adapted to produce an output cycle once every hour and this output is applied to, and counted by, the hours counter 23. The hours counter is adapted to produce an output cycle once every day, which cycles are applied to and counted by the days counter. The output from the days counter 24 resets the flip-flop 30. When the flip-flop 30 is reset, it applies an output voltage to the amplifier circuit 25. The output from the amplifier 25 is applied to relay circuit 26 which operates the device to be actuated. The output cycles from the pulse source, the frequency divider, the seconds counter, the minutes counter, the hours counter, and the days counter are all actually of a square wave-form. The succeeding device to which the output wave-form from the preceding device is applied actually only acts upon that part of the square wave-form that changes from a high voltage to a low voltage. For example, the seconds counter only counts the number of times the output from the frequency divider changes from a high voltage to a low voltage. Since this happens once a cycle in a square wave and since the output from the frequency divider is at a frequency of one cycle per second, the seconds counter counts once every second. The circumstance of the output voltage from the pulse source, the frequency divider, and the seconds, minutes, hours, and days counters changing from a high voltage to a low voltage shall be called an output "pulse" in the rest of the description of the miniature timer. This so called output "pulse" is the output condition to which the succeeding devices respond.

The counters 21, 22 and 23 are reset to register a predetermined count after each output "pulse" produced by the respective counter. For example, when the seconds counter produces an output "pulse" it is applied to the third stage of the seconds counter to automatically set a count of four to register in the seconds counter. That is, the seconds counter is set in the same condition that it would be in if four output "pulses" had already been counted from the frequency divider 32. Since the seconds counter is a six stage binary counter, one output "pulse" would ordinarily be produced from the last stage for every 64 "pulses" counted. But since the output from the last stage sets the counter to register a count of four, an output will be produced for every 60 output "pulses" counted. The details of how the setting of the counter by the output "pulse" is accomplished will be described in the explanation of the detailed circuitry. In this way, the seconds counter is adapted to produce an output "pulse" once every minute; likewise, the minutes counter is adapted to produce an output "pulse" once every hour. The hours counter is adapted to produce an output "pulse" once every day by setting the hours counter to register a count of eight in response to the output "pulse" from the last stage of the hours counter. Since the hours counter is a five stage binary counter, it will produce an output "pulse" once every 32-minus-8 hours, or once every day.

To begin operation the set switch 369 is closed. The set switch applies a control voltage to set the flip-flop 30 so that the output from the flip-flop 30 to amplifier 25 is low. As a result, at the start of the operation the output from the amplifier 25 is insufficient to operate the relay circuit 26 and relay circuit 26 is unoperated.

When the set switch 369 is operated, it also applies a bias voltage to each of the counters 21 through 24 and to the frequency divider. This bias voltage is applied to each stage of each counter and to each stage of the frequency divider. As a result, each stage is made non-responsive to the output from the preceding stage; the frequency divider is made non-responsive to the output "pulses" from the pulse source 20, the seconds counter is made non-responsive to the output "pulses" from the frequency divider, and the minutes, hours, and days counters are made non-responsive to the output "pulses" from the preceding counters. The effect of this bias is to hold the count that is registered in each counter and in the frequency divider. After the switch 369 has been closed, the clear button 380 is operated. This sets the count registered in the frequency divider 32 and in each of the counters 21—24 to zero. That is, it sets each stage of each counter and each stage of the frequency divider in a condition wherein the transistor on the right side is conducting, and the transistor on the left side is not conducting. The operator then releases the clear button and the counters 21—24, and the frequency divider 32 all remain with a count of zero registered therein, and they are maintained in this condition by the bias applied by the set switch 369. At this time, the initial count to be registered in the seconds counter, minutes counter, hours counter and days counter is set by means of a control board (not shown in Figure 4) while the set switch 369 applies the bias. When the initial count has been registered in each of the counters by means of the control board, the miniature timer is ready to begin the timing operation. The time interval of the timer is begun by opening the set switch 369 which takes the bias off of the frequency divider 32 and each of the counters 21—24. As a result, the frequency divider begins to count the output "pulses" produced by the pulse source 20 and producing an output "pulse" itself at a rate of one cycle per second. The seconds counter also begins counting the output "pulses" from the frequency divider, the minutes, hours, and days counters all begin counting the output "pulses" from the seconds, minutes, and hours counters, respectively. The time interval between the start of operation of the timer and the operation of the output relay circuit 26 can be selectively varied by varying the initial count registered in each of the counters 21—24. For example, the seconds counter 21 will produce its first output "pulse" after a time interval depending upon the count which was initially registered in the counter. Thereafter, each output "pulse" from the seconds counter will come once every minute. The time of first output "pulse" from the minutes counter will depend upon the initial count registered in the minutes counter and the initial count registered in the seconds counter. Thereafter, each output "pulse" from the minutes counter will come once every hour. The hours counter operates in the same way. The first output from the hours counter occurs after a time interval depending on the number of minutes, seconds and hours initially registered on each one of the respective minutes, seconds, and hours counters. Thereafter, an output "pulse" is produced from the hours counter once every 24 hours, or once every day. Likewise, the days counter will produce an output pulse depending upon the number of days registered in it, the number of hours registered in the hours counter, the number of minutes registered in the minutes counter, and the number of seconds registered in the seconds counter. For example, suppose an initial count of 15 is registered in the seconds counter, an initial count of 31 is registered in the minutes counter, an initial count of 20 is registered in the hours counter, and an initial count of 2 is registered in the days counter. The seconds and minutes counters are 6 stage counters, so they will produce their first out "pulse" after receiving 64–X "pulses" where X is the initial count registered in the counter. The hours and days counters are 5 stage counters, so they will produce output after counting 32–X "pulses" where X is the initial count registered in these counters. Since, in the example, the initial count registered in the seconds counter is 15, then the first output "pulse" will occur after the seconds counter receives 64 minus 15 "pulses," and since the seconds counter receives one "pulse" every second, the seconds counter will produce an output "pulse" after 49 seconds. Thereafter, the seconds counter will produce an output "pulse" once every minute as has been explained. The minutes counter in the example was initially set to register a count of 31 so the first output "pulse" from the minutes counter will occur after it has counted 64 minus 31 "pulses" from the seconds counter or after 33 pulses. Since the first "pulse" came after 49 seconds and each succeeding "pulse" came at one minute intervals, the output from the last stage of the minutes counter will come after 32 minutes and 49 seconds. By similar reasoning, it is seen that since the hours counter in the example had a count of 20 initially registered therein, the first output from the hours counter will come after 11 hours, 32 minutes and 49 seconds. Likewise, considering that the initial count registered in the days counter is 2, an output from the days counter will reset the flip-flop 30 and thereby actuate the output device after 29 days, 11 hours, 32 minutes, and 49 seconds.

The detailed circuitry of the miniature counter is shown in Figures *5a*, *5b*, *5c*, and *5d*. The constant frequency pulse source 20 is not shown in detail because it is the same as the oscillator and pulse shaper combination used in the intervalometer.

The output from the pulse source 20 is a square wave and is applied to the frequency divider 32. The frequency divider 32 comprises an eleven stage binary counting chain. Only the first stage 309, the second stage 310, and the last stage 319 are shown in detail. The remaining stages 311–318 are merely shown as dashed line rectangles as the circuitry of each stage is exactly the same as those shown. For convenience, the frequency divider 32 has been shown in two rows with the first five stages 309–313 shown in the first row and the last six stages 314–319 in the second row. The conductors 322 and 324 are respectively the power line for supplying power to the frequency divider and the ground connection. The conductor 323 connecting the fifth stage 313 with the sixth stage 314 is the means by which counting pulses are passed from the fifth to the sixth stage. This conductor corresponds to conductor 325 between the first and second stages 309 and 310. The square wave output from the pulse source 20 is applied to the first stage 309 of the frequency divider. There the square wave is differentiated by capacitor 301 and the resulting wave-form applied to rectifiers 302 and 303 is a continuous series of alternate positive and negative spikes. The rectifiers 302 and 303 only pass the negative spikes to the bases of transistors 320 and 321. The transistors are connected together in a flip-flop circuit. The frequency divider 32 counts the "pulses" from the pulse source 20 in the same manner as the frequency divider 5 counts the cycles from the pulse shaper 4 in the intervalometer.

The additional flip-flop stages are used making a total of eleven stages instead of nine so that the frequency output from the frequency divider 32 is one cycle per second instead of 4 cycles per second. The purpose of the inputs to the frequency divider from line 305 is to bias the input to each stage to render the frequency divider inactive to count the output "pulses" produced by the pulse source 20. The purpose of the inputs from line 305 is to clear the count registered in the frequency divider to zero. How this circuitry performs these functions will be explained below. The square wave output from the collector of transistor 304 of the last stage 319 of the frequency divider 32 is applied to the seconds counter 21 over line 307 where it is differentiated by the capacitor 308.

The seconds counter 21, which is a six stage binary counting chain, is shown in two rows the first three flip-flop stages 326—328 being fully shown in the top row and the second three flip-flop stages 329—331 being fully shown in the bottom row. For convenience, each separate stage has been enclosed in a dashed line to distinguish the stages from one another. The seconds counter counts the ouput "pulses" from the frequency divider 32 in the same way that the binary counting chain 6 in the intervalometer counts the output cycles from its frequency divider 5. The square wave output from the last stage 331 of the seconds counter on line 308 is differentiated by the capacitor 309 in the first stage 338 of the minutes counter 22, and the resulting positive and negative spikes are applied to rectifiers 332 and 333 of the first stage of the minutes counter. The positive and negative spikes from capacitor 309 are also applied to the rectifier 334 which passes only the negative spike and applies it over the line 336 to the base of transistor 335 of the third stage 328 of the seconds counter 21. The rectifier 334 passes this negative spike to the third stage 328 when the seconds counter produces an output "pulse." This negative spike will cause the transistor 335 to turn off and causes the transistor flip-flop in the third stage 328 of the seconds counter 21 to assume the stable state whereby the transistor 349 is conducting and the transistor 335 is not conducting. In this manner, a count of four is automatically registered in the seconds counter 21 each time it produces an output "pulse." The seconds counter thereby produces an output "pulse" once every 60 seconds or one every minute. This one output "pulse" every minute is applied to the minutes counter 22 over line 308 and is counted by the minutes counter.

The minutes counter 22 comprises a six stage binary counting chain of which only the first, third, and last stages, 338, 340 and 343 are shown in detail. The second, fourth and fifth stages, 339, 341, and 342 are shown as dashed line rectangles and the circuitry of each of these stages is the same as the first and last stages 338 and 343. The minutes counter 22 counts the output pulses from the seconds counter 21 in the same manner as the binary counting chain 6 in the intervalometer counts the cycles from the frequency divider 5. The output "pulses" from the minutes counter 22 are applied to the hours counter 23 by means of line 347. The minutes counter 22 is adapted to produce an output "pulse" once every hour by means of rectifier 337 and line 344 in the same manner that the seconds counter is adapted to produce an output "pulse" once every minute.

The hours counter 23 comprises a binary counting chain of five flip-flop stages 350—354 which operate the same way as the previously described binary counting chains. The first, fourth and fifth stages, 350, 353 and 354, are shown in detail. The second and third stages 351 and 352 are shown as dashed line rectangles and their circuitry is the same as the circuitry shown in the first and last stages 350 and 354. The output "pulses" from the hours counter 23 are applied to the days counter 24 over line 348. By means of rectifier 345 and line 346 the hours counter 23 is set to register a count of eight each time it produces an output pulse by properly setting the flip-flop in the fourth stage of the hours counter. The hours counter thereby produces an output "pulse" once every day.

The days counter 24 comprises five identical transistor flip-flop stages and counts the output pulses from the hours counter 23 in the same manner that the binary counting chain 6 in the intervalometer counts the cycles from the frequency divider 6. Since each stage is identical only the first and last stages have been shown in detail.

Each stage of each of the counters has a separate input lead from a control board (not shown in Figures 5*a*–5*d*). For example, the seconds counter 21 has leads 383 through 391 which are connected to separate contacts on the control board; likewise, each stage of the minutes, hours, and days counters have input leads connected to a separate contact on the control board. These leads are used to register an initial count in the counter 21—24. How this operation is done will be explained below.

To apply power to the miniature timer, the douple pole power switch 366 is closed. A positive voltage of 2.6 volts is applied over line 367 from battery 368 to apply power to the transistors 413 and 370 of a flip-flop circuit and to the amplifying transistors 371 and 412. Since the relay 401 is not energized at this time, power is applied over the back contacts of relay to supply power to the binary counters 21—24, the frequency divider 32 over line 322. When the double pole set switch 369 is closed, 2.6 volts are applied over this switch to apply a bias on line 305. This causes current to flow through resistors 373 and 374 and rectifier 375 causing a positive voltage to be applied to the base of transistor 370 of a flip-flop circuit. The flip-flop circuit operates in the same manner as the other transistor flip-flops and as a result of the positive vo'tage being applied to the base of transistor 370, this transistor is turned on and transistor 413 is turned off. Therefore, the collector of transistor 370 is at a low potential and a low voltage is applied from this collector to the base of transistor 371.

The input from transistor 370 is applied to the base of transistor 371 over resistor 372. The emitter of transistor 371 is connected to ground and the collector is connected to the power source of 2.6 volts on line 367 through resistor 410. Since there is a low voltage applied to the base of transistor 371, a high voltage will be maintained on the collector of the transistor and the collector is connected to the base of transistor 412. The emitter of transistor 412 is connected to ground and the collector is connected to the power supply on line 367 through the resistor 411. Because a high voltage is applied to the base of transistor 412, a low voltage will be maintained on the collector of this transistor and the collector of this transistor is connected to the base of transistor 376. The emitter of transistor 376 is connected to the line 367 through resistor 377 and to ground through resistor 378. The purpose of these two resistors is to provide the proper bias to the emitter of transistor 376 so that the low voltage applied to the base of this transistor from the collector of transistor 412 will be below the cut-off point of transistor 376. Transistor 376 will therefore not conduct when the output from the collector of transistor 370 of the flip-flop circuit is low. The collector of transistor 376 is connected through the winding of relay 401 to a D.C. battery source 402 of 22.5 volts applied to line 379 by power switch 366. Since the transistor 376 does not conduct, no current flows through the winding of relay and the relay 401 is not energized. When the flip-flop circuit of transistors 413 and 370 is in the opposite state, the output from the collector of transistor 370 applied to the collector of transistor 371 is a high voltage. This will cause the collector of transistor 371 to apply a low voltage to the base of transistor 412 which will in turn apply a high voltage to the base of transistor 376. The latter transistor will thereby be rendered conductive and current will flow through the winding of relay 401 energizing the relay closing the front contacts of relay 401. Thus, power will be applied to the output device from the 3 volts on line 367 over the front contacts of relay 401. The transistors 371 and 412 serve to amplify the signal voltage put out by the collector of transistor 370 of the flip-flop and apply it to the base of transistor 376. The transistor 376 serves as a switch which is controlled by the amplified signal applied to its base to turn the current off and on through the relay 401.

In this application the output device is shown only as a lamp 40 which is also shown mounted on the control board shown in Figure 6. It is understood that additional contacts could be operated by relay 401 to control other output devices.

To clear the binary counters 21—24 and the frequency divider 32, the clear button 380 is closed. When switch 380 is closed, a positive voltage is applied over line 306 to all counting stages of the miniature timer and sets each stage in the same state. In this manner all of the counters are set to their lowest count, namely zero. A positive voltage is applied to the base of the left transistor of each stage from the line 306 over a rectifier, for example, the rectifier 381 of the first stage 326 of the seconds counter 21. This positive voltage causes the left transistor in each stage to conduct. Therefore, after the clear button has been operated, the left transistor in each stage of each counter is in a conducting state. When each stage of a binary counting chain is in this condition (left transistor conducting) the count registered in the counter is zero. Therefore, by pressing the clear button, all of the binary counters are cleared to a count of zero. The clear button also clears the binary counting chain in the frequency divider to zero in the same manner.

As was stated above, the switch 369 applies a positive voltage of 2.6 volts to line 305 over the back contacts of relay 401 and power switch 366. This bias voltage on line 305 is applied to each stage of the binary counters 21—24 and the frequency divider 32. For example, in the first stage 309 of the frequency divider 32, a resistor 382 is connected from between the input rectifiers 302 and 303 and the capacitor 301 to line 305 and resistor 385 is connected from this point to ground. When the positive 2.6 volts is applied to line 305 current flows through resistors 382 and 385 causing a positive voltage to be applied to rectifiers 302 and 303. This positive voltage biases the rectifiers 302 and 303 so that any negative spikes produced by the capacitor 301 will not be passed by the rectifiers 302 and 303 to the bases of transistors 320 and 321, which comprise the flip-flop in the first stage 309 of the frequency divider 32. In this manner, the first stage of the frequency divider 32 is made non-responsive to output "pulses" from the pulse source 20. In a like manner, the remaining stages of the frequency divider 32 are made non-responsive to the preceding stages. Also, all of the stages of the binary counters 21—24 are similarly made non-responsive to negative spikes produced by the input capacitors.

While the set switch 369 is closed and maintains the negative bias on line 305, the initial count can be registered in the counters 21—23. The registering of the initial count is done by means of a control board (not shown in Figures 5*a*–5*d*). The base of the left transistor of each stage of each of the counters 21—24 is connected to a separate contact on the control board. For example, the base of transistor 383 of the first stage 326 of the seconds counter 21 is connected to a contact on the control board by means of the lead 386. Each stage of each of the counters 21—24 has a similar connection to a separate contact on the control board. By means of the control board and the probe 392, a ground is applied to the left transistor of selected stages of the counters 21—24 to cause those transistors to stop conducting and thereby set the state of the selected stage to be that in which the left transistor is not conducting and the right transistor is conducting. This operation of setting the initial count into each of the binary counters is generally carried out after the clear button has been pressed. As was stated above, this has the effect of clearing each of the counters to zero and each stage of each counter is in that state in which the left transistor conducts and the right transistor does not conduct. Accordingly, when a stage is selected by the probe 392 on the control board, it is switched to the opposite state.

For example, when a ground is applied on lead 386, the ground will be applied to the base of transistor 383 and cause that transistor to turn off and as a result cause the transistor 384 to turn on. Similarly, each stage can be switched to its opposite state in this manner. Those stages to which the ground is applied to the base of the left transistor by means of the control board and probe are switched to the opposite state in which the left transistor is not conducting and the right transistor is conducting. Since prior to the application of ground potential to the selected contacts on the control board the clear button had been operated and had cleared all of the counters 21—24 to zero, all of the unselected stages are left in a state in which the left stage is conducting and the right stage is non-conducting. In this manner, the initial count is registered in the counters 21—24.

The individual contacts on the control board are grounded by means of the select probe 392. A ground circuit is closed to the select probe when the set switch 369 is closed.

In the example given with respect to the block diagram in Figure 3, the miniature timer was to be set to produce an output after 29 days, 11 hours, 32 minutes, and 49 seconds. This was to be done by registering initial counts of 15, 31, 20 and 2 in the respective seconds, minutes, hours and days counters 21—24. A count of 15 would be registered in the seconds counter by applying the grounded select probe to leads 386, 387, 388 and 389 via the contacts on the control board. This causes the first, second, third and fourth stages 326—329 to switch to the state in which the left transistor is not conducting and the right transistor conducts. The probe is not applied to leads 390 and 391 and accordingly, the remaining stages 330 and 331 remain in the opposite state. In a like manner, counts of 31, 20 and 2 are registered in the respective minutes, hours and days counters by grounding the appropriate leads. The miniature timer is set in this manner to actuate the output device after an interval of 29 days, 11 hours, 32 minutes and 49 seconds. The miniature timer will not start measuring this interval until the set switch 369 is opened. When the set switch 369 is opened, it removes the bias from line 305 and also makes the clear button 380 inoperative by removing the power therefrom. When the bias is removed from the line 305, the frequency divider 32 begins counting the output "pulses" from the pulse source 20 and producing output "pulses" at a rate of 1 "pulse" per second. The counters 21—24 begin operating at this time and the output device will be actuated at the selected interval of time after the set switch 369 is opened.

When the last stage 359 of days counter 24 changes its state to cause the voltage on line 394 to change from a high voltage to a low voltage, the capacitor 393 differentiates a negative spike, which is applied to the base of this transistor 370 through the rectifier 395. As stated above, the transistor 370 is connected in a flip-flop circuit with transistor 413. The negative spike applied to the base of transistor 370 will cause this transistor to turn off and the transistor 413 to turn on and a high voltage will be produced at the collector of transistor 370 which is applied to the amplifier consisting of transistors 371 and 412. When the amplifier receives this high voltage it causes the transistor 376 to switch on and the relay 401 to operate, thus closing the output circuit. When the relay 26 is energized, it opens its back contacts which removes the power from the line 322 and thereby removes power from all the circuitry of the miniature timer except the flip-flop comprising transistors 413 and 370, the amplifier comprising transistors 371 and 412, and the lamp 40, which receive power from line 367, and the relay circuit including the relay 401 and the transistor 376, which receives power from the battery 368. Power is also removed from the set switch 369 since it derives its power from the line 322. In order to set the flip-flop circuit comprising transistors 413 and 370 after it has been reset by the output "pulse" from the days counter, power must be applied to line 305 over the set switch 369 from line 322. But since power has been removed from the line 322 by opening of the back contact of the relay 401, the closing of the set switch 369 after the flip-flop has been reset will have no effect. The only way that the relay 401 can be deenergized after it has become energized is to open the power switch 366. To use the miniature timer again after the relay 401 has been energized, the power switch 366 must be opened and reclosed, the set switch 369 should then be closed before closing the contacts of the clear button 380 so that the flip-flop circuits will assume the proper state before the timer is set for the desired time interval using the probe 392.

Figure 6 shows the control board to be used with the miniature timer. The control board is mounted on the top of the casing of the miniature timer unit and the showing in Figure 6 constitutes the top view of the entire miniature timer unit. The view shown is 2 times the actual size of the unit.

From left to right are shown the clear button 380, the set switch 369 and the power switch 366. The clear button 380 and the power switch 366 are labeled "Clear" and "Power," respectively. The power switch 366 and the set switch 369 are toggle switches and have their open and closed positions labeled, respectively, "Off" and "On" and "Count" and "Set."

Figure 5A:
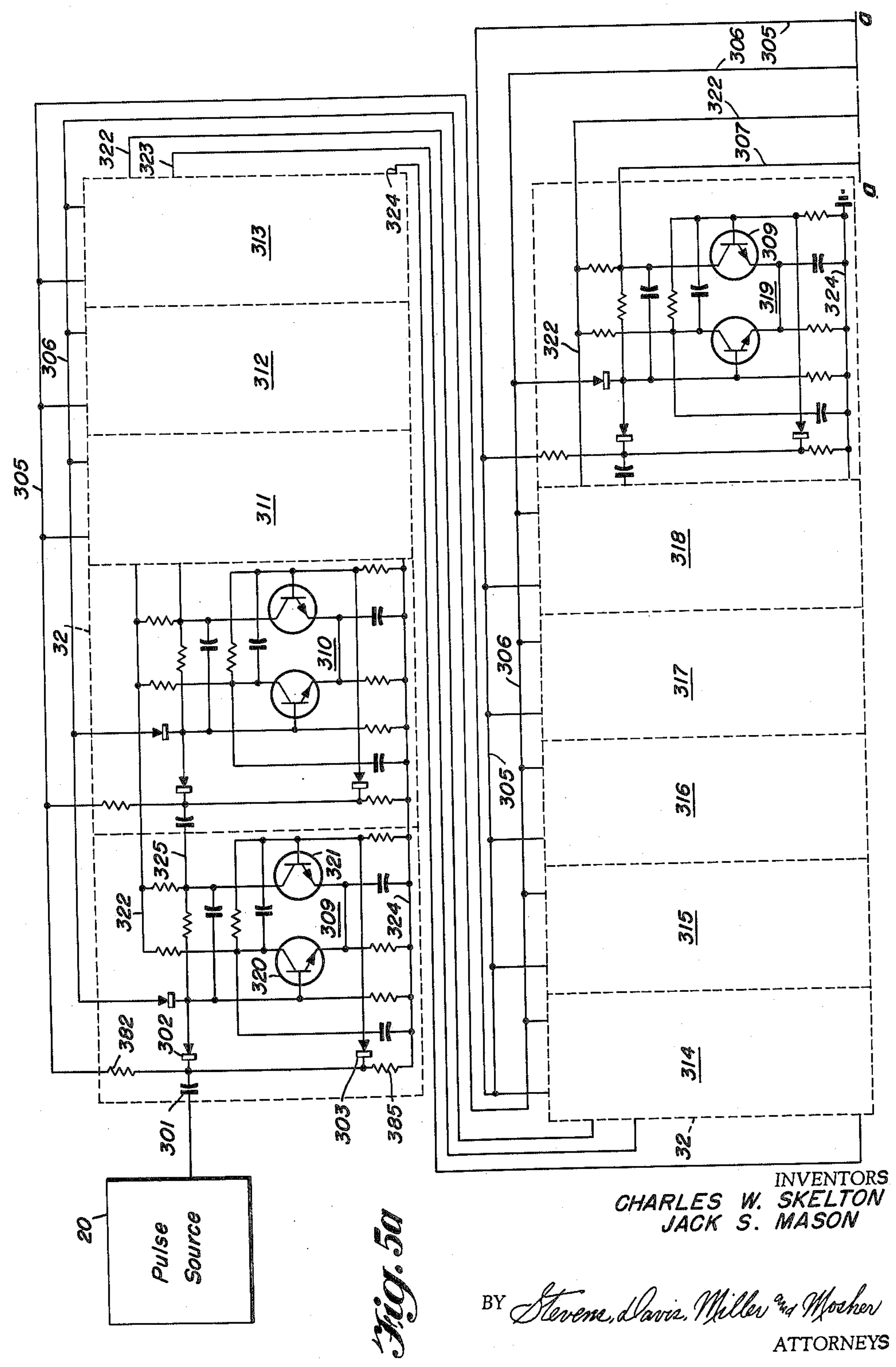
Figure 5B:
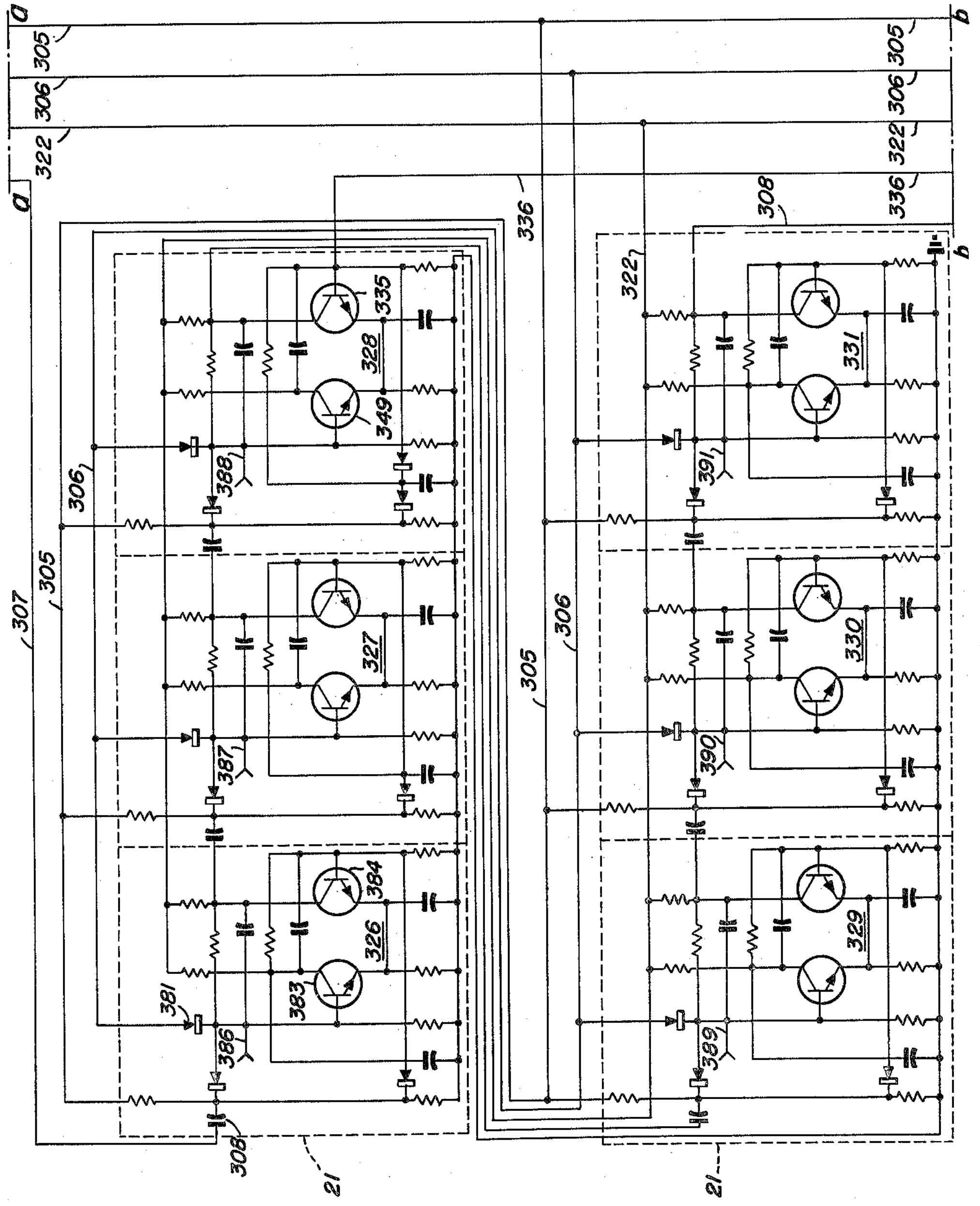
Figure 5C:
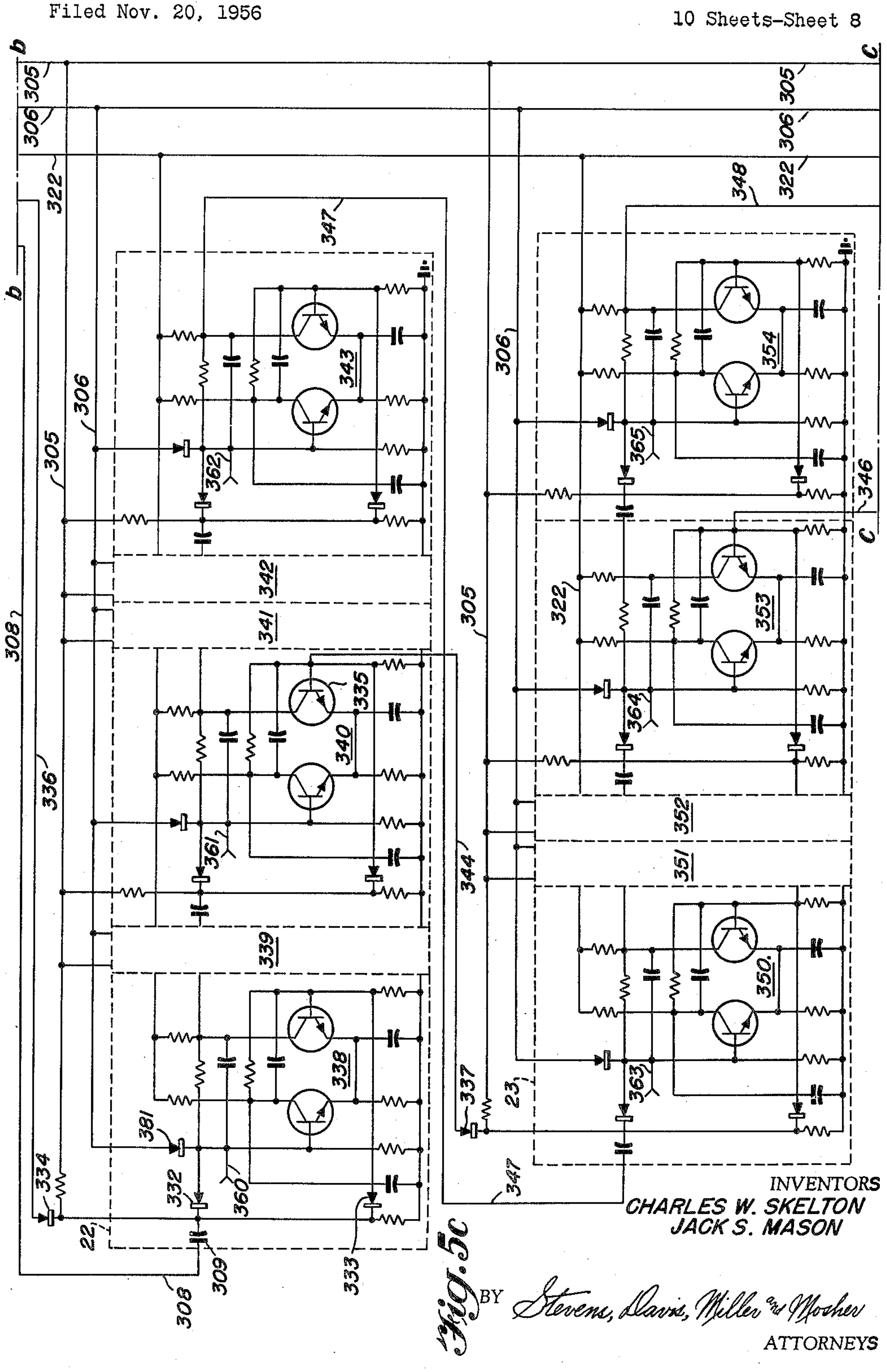
Figure 5D:
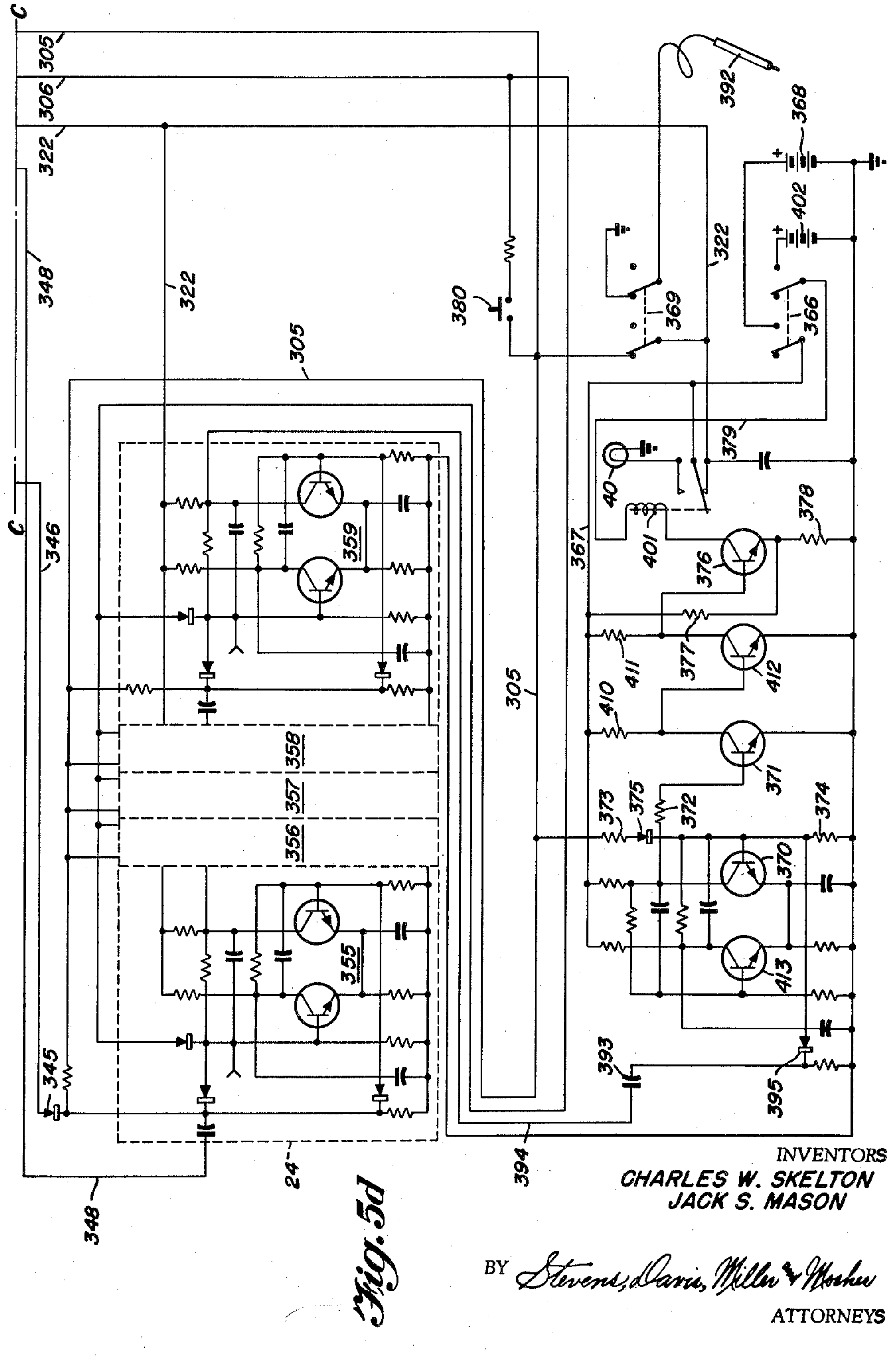

The indicating lamp 40 is energized when the relay 401 (Figure 5*d*) is energized and is labeled "Output." Probe 392 is connected to a ground circuit when the set switch 369 is closed and by applying the probe 392 to selected ones of the contacts 42 a desired count can be registered in the binary counters so that when they start counting the "pulses" from the frequency divider, the output circuit will be actuated after the selected interval of time. Contacts 42 are the contacts to which the leads from the counters 21—24, Figures 5*b* and 5*c*, are connected. Leads 386 through 391 in seconds counter 21 are connected to the contacts 42 in the row labeled "Seconds." The leads from the minutes, hours and days counter are connected respectively to the contacts 42 in the rows labeled "Minutes," "Hours" and "Days" respectively.

The contacts in the columns labeled "1," "2," "4," "8," "16" and "32" are connected to the first, second, third, fourth and fifth stages respectively of the counters 21—24 (Figures *5b* and *5c*). These column labels indicate the initial count that will be registered in the respective counter if the probe 41 is applied to the selected contact.

It is apparent that the principles of this invention may be applied to the design of an intervalometer or a miniature timer having more stages or more counters. For example, the miniature timer could have another counting chain for months and a further counting chain for years. Likewise, the number of stages of the binary counting chain in the intervalometer could be increased to give a wider time range.

Instead of using transistor flip-flops, miniature tube flip-flops or magnetic storage cores could be used in the counting chains. Transistors were chosen because no power is required for heating cathodes. Using magnetic storage cores would require the use of driving tubes which would materially increase the size and weight of the timers. These and other modifications which are within the skill of those in the art are considered to be a part of this invention, which is to be limited only as defined in the appended claims.

What is claimed is:

1. A timing device comprising; a flip-flop having a first and second stable state, first means for producing a constant frequency waveform each cycle thereof having a first part and a second part; means responsive to said first part of said waveform cycles for setting said flip-flop in said first stable state; counting means responsive to said waveform to count the cycles thereof and to produce an output condition after registering a predetermined count, said output condition occurring at the time of said second part of said waveform; means for selectively presetting the count registered by said counting means, means responsive to said output condition for resetting the flip-flop in said second stable state; said means responsive to said first part of said waveform thereafter setting said flip-flop back into its first stable state when said first part of said waveform next occurs, so that said flip-flop is in its second stable state for the precise time interval that elapses after the occurrence of said second part of said waveform and before the next occurrence of said first part of said waveform, and output means actuated in response to said flip-flop being in said second stable state.

2. A timing device as recited in claim 1 wherein said counting means comprises a chain of transistor flip-flops.

3. A timing device comprising; first means for producing a constant frequency waveform, a counter responsive to the waveform to count the cycles thereof and to produce an output condition upon registering a predetermined count, second means for initially setting the counter to register a first count, whereby the first cycle of said waveform counted by said counter after said initial setting causes said counter to reach said predetermined count and produce said condition, third means actuated in response to said output condition of said counter, fourth means responsive to said third means being actuated setting said counter to register a second count, means to selectively vary the count which said fourth means set said counter to register.

4. A timing device as recited in claim 3 wherein said counter comprises a chain of transistor flip-flops.

5. A timing device comprising a first means for producing a constant frequency waveform, a counter responsive to said waveform to count the cycles thereof and to produce an output condition upon registering a predetermined count, said counter comprising a binary counter having flip-flop stages, each of said stages having a means including a conductor to set the respective flip-flop stage to a predetermined one of its stable states in response to a predetermined potential applied over the said conductor of the respective flip-flop stage, the count registered by said counter when each of said stages is in its predetermined one of its stable states being one less than said predetermined count, conductive means connecting the said conductors of each of said flip-flop stages together, first means for applying said predetermined potential to said conductive means, output means actuated in response to said output condition produced by said counter, and means responsive to said output means being actuated for applying said predetermined potential to said conductive means and to simultaneously block the application of said predetermined potential to the said conductor of any selected ones of said flip-flop stages.

6. A timing device as recited in claim 5 wherein said flip-flop stages comprise transistor circuits.

7. A timing device comprising an oscillator producing a constant frequency output, means responsive to the output of said oscillator for producing a waveform at a constant frequency, a counting means responsive to said waveform to count the cycles thereof and produce an output condition upon registering a predetermined count, means to selectively preset said counting means to register any desired count and thereby vary the number of said cycles that are counted before said output condition is produced, output means operated in response to said output condition, and control means to selectively apply a bias to said counting means to render said counting means inactive to perform a counting operation.

8. A timing device comprising an oscillator producing a constant frequency output, means responsive to the output of said oscillator for producing a waveform at a constant frequency, a counting means responsive to said waveform to count the cycles thereof and produce an output condition upon registering a predetermined count, means to selectively preset said counting means to register any desired count and thereby vary the number of said cycles that are counted before said output condition is produced, said means to selectively preset said counting means comprising a plurality of contacts on a control board and a probe, said desired count being selected by applying said probe to selected ones of said contacts, output means operated in response to said output condition, and control means to selectively apply a bias to said counting means to render said counting means inactive to perform its counting operation.

9. A timing device comprising an oscillator producing a constant frequency output, means responsive to the output of said oscillator for producing a waveform at a constant frequency, a counting means responsive to said waveform to count the cycles thereof and produce an output condition upon registering a predetermined count, means to selectively preset said counting means to register any desired count and thereby vary the number of cycles that are counted before said output condition is produced, output means operated in response to said output condition, and a clear switch to set said counting means to register a second predetermined count in said counting means.

10. A timing device comprising an oscillator producing a constant frequency output, means responsive to the output of said oscillator for producing a waveform at a constant frequency, a counting means responsive to said waveform to count the cycles thereof and to produce an output condition upon registering a predetermined count, said counting means comprising a plurality of binary counting chains, each succeeding counting chain adapted to count the output cycles from the preceding chain and at least one of the preceding counting chains adapted to cycle at a rate of one cycle per a standard unit measure of time, means to selectively preset said counting means to register any desired count and thereby vary the number of cycles that are counted before said output condition is produced, said means to selectively preset said counting means comprising a plurality of contacts mounted on a board and a probe, each of said contacts being connected to a separate stage of said binary counting chains, said desired count being selected by applying said probe to selected contacts, and output means operated in response to said output condition.

11. A timing device comprising a binary counting chain comprising a plurality of transistor flip-flop stages, each flip-flop stage of said counting chain comprising a first transistor and a second transistor, said first and second transistors of each stage having a collector, base, and emitter, a first resistor in each flip-flop stage having one terminal connected to the collector of the said first transistor of the respective flip-flop stage, a second resistor in each flip-flop stage having one terminal connected to the collector of the said second transistor of the respective flip-flop stage, means for all of said flip-flop stages to apply a D.C. voltage between the emitter of each transistor and the other terminal of the resistor connected to the collector of the respective transistor, circuit means in each flip-flop stage for driving the base of the said second transistor of the respective flip-flop stage with a signal derived from the collector of the said first transistor of the respective flip-flop stage, circuit means in each flip-flop stage for driving the base of the said first transistor of the respective flip-flop stage with a signal derived from the collector of the said second transistor of the respective flip-flop stage, means to cause the first flip-flop stage of the binary counting chain to switch back and forth between its two stable states at a constant frequency, said last named means including means to drive the base of at least one of the transistors of the first flip-flop stage of said binary counting chain with a constant frequency signal, said binary counting chain including circuit means to cause each succeeding flip-flop stage of the binary counting chain to switch back and forth between its first and second stable states at a rate one-half the frequency of the immediately preceding flip-flop stage of the binary counting chain, said last named circuit means including means to drive the base of at least one of the transistors of each succeeding flip-flop stage with a signal derived from the collector of one of the transistors of the preceding flip-flop stage, means to selectively preset said binary counting chain to register any desired count, and output means operated in response to said binary counting chain registering a predetermined count.

12. A timing device comprising a binary counting chain comprising a plurality of transistor flip-flop stages, each flip-flop stage of said counting chain comprising a first transistor and a second transistor, said first and second transistors of each flip-flop stage having a collector, base, and emitter, a first resistor in each flip-flop stage having one terminal connected to the collector of the said first transistor of the respective flip-flop stage, a second resistor in each flip-flop stage having one terminal connected to the collector of the said second transistor of the respective flip-flop stage, means for all of said flip-flop stages to apply a D.C. voltage between the emitter of each transistor and the other terminal of the resistor connected to the collector of the respective transistor, circuit means in each flip-flop stage for driving the base of the said second transistor of the respective flip-flop stage with a signal derived from the collector of the said first transistor of the respective flip-flop stage, circuit means in each flip-flop stage for driving the base of the said first transistor of the respective flip-flop stage with a signal derived from the collector of the said second transistor of the respective flip-flop stage, means to generate a square waveform signal, a capacitor having one plate connected to the output of said means to generate a square wave, said capacitor being of such size to differentiate said square wave into positive and negative spikes, a first rectifier connecting the other plate of said capacitor to the base of the said first transistor of the first flip-flop stage of said binary counting chain, a second rectifier connecting said other plate of said capacitor to the base of the said second transistor of the first flip-flop stage of said binary counting chain, said binary counting chain including circuit means to cause each succeeding flip-flop stage of the binary counting chain to switch back and forth between its first and second stable states at a rate one-half the frequency of the immediately preceding flip-flop stage of the binary counting chain, said last named circuit means including means to drive the base of at least one of the transistors of each succeeding flip-flop stage with a signal derived from the collector of one of the transistors of the preceding flip-flop stage, means to selectively preset said binary counting chain to register any desired count, and output means operated in response to said binary counting chain registering a predetermined count.

13. A timing device comprising a binary counting chain comprising a plurality of transistor flip-flop stages, each flip-flop stage of said counting chain comprising a first transistor and a second transistor, said first and second transistors of each stage having a collector, base, and emitter, a first resistor in each flip-flop stage having one terminal connected to the collector of the said first transistor of the respective flip-flop stage, a second resistor in each flip-flop stage having one terminal connected to the collector of the said second transistor of the respective flip-flop stage, means for all of said flip-flop stages to apply a D.C. voltage between the emitter of each transistor and the other terminal of the resistor connected to the collector of the respective transistor, circuit means in each flip-flop stage for driving the base of the said second transistor of the respective flip-flop stage with a signal derived from the collector of the said first transistor of the respective flip-flop stage, circuit means in each flip-flop stage for driving the base of the said first transistor of the respective flip-flop stage with a signal derived from the collector of the said second transistor of the respective flip-flop stage, means to cause the first flip-flop stage of the binary counting chain to switch back and forth between its two stable states at a constant frequency, said last named means including means to drive the base of at least one of the transistors of the first flip-flop stage of said binary counting chain with a constant frequency signal, a capacitor for each succeeding flip-flop stage in said binary counting chain having one plate connected to the collector of one of the transistors of the immediately preceding flip-flop stage in said binary counting chain, said capacitor being of such size to differentiate the signals produced at the collectors of the transistors of the immediately preceding transistor stage, a first rectifier for each succeeding flip-flop stage connecting the other plate of the said capacitor for the respective succeeding flip-flop stage to the base of the said first transistor of the respective succeeding flip-flop stage, a second rectifier for each succeeding flip-flop stage connecting the said other plate of the said capacitor for the respective succeeding flip-flop stage to the base of the said second transistor of the respective succeeding flip-flop stage, means to selectively preset said binary counting chain to register any desired count, and output means operated in response to said binary counting chain registering a predetermined count.

14. A timing device comprising a binary counting chain comprising a plurality of transistor flip-flop stages, each flip-flop stage of said counting chain comprising a first transistor and a second transistor, said first and second transistors of each stage having a collector, base, and emitter, a first resistor in each flip-flop stage having a terminal connected to the collector of the said first transistor of the respective flip-flop stage, a second resistor in each flip-flop stage having one terminal connected to the collector of the said second transistor of the respective flip-flop stage, means for all of said flip-flop stages to apply a D.C. voltage between the emitter of each transistor and the other terminal of the resistor connected to the collector of the respective transistor, circuit means in each flip-flop stage for driving the base of the said second transistor of the respective flip-flop stage with a signal derived from the collector of the said first transistor of the respective flip-flop stage, circuit means in each flip-flop stage for driving the base of the said first transistor of the respective flip-flop stage with a signal derived from the collector of the said second transistor of the respective flip-flop stage, means to cause the first flip-flop stage of the binary counting chain to switch back and forth between its two stable states at a constant frequency, said last named means including means to drive the base of at least one of the transistors of the first flip-flop stage of said binary counting chain with a constant frequency signal, further means to apply a predetermined potential to the bases of the said first transistors of any selected ones of said flip-flop stages of said binary counting chain to selectively preset said binary counting chain to register any desired count, and output means operated in response to said binary counting chain registering a predetermined count.

References Cited in the file of this patent

UNITED STATES PATENTS

| | | |
|---|---|---|
| 1,882,989 | Schumacher | Oct. 18, 1932 |
| 2,303,862 | Peterson | Dec. 1, 1942 |
| 2,493,627 | Grosdoff | Jan. 3, 1950 |
| 2,622,212 | Anderson et al. | Dec. 16, 1952 |
| 2,719,917 | Chapman | Oct. 4, 1955 |
| 2,769,595 | Bagley | Nov. 6, 1956 |
| 2,797,328 | Miller | June 25, 1957 |
| 2,844,790 | Thompson et al. | July 22, 1958 |

OTHER REFERENCES

Article entitled, "Predetermined Counters" by Wild, Electronics, March 1947, pp. 120–123.

Article entitled, "Preset Interval Timer," Electronic Industries, July 1945, pp. 97–99, 130, 134, 138, 142 and 146.